US012302319B2

(12) United States Patent
Yang et al.

(10) Patent No.: US 12,302,319 B2
(45) Date of Patent: *May 13, 2025

(54) UPLINK CONFIGURED GRANT TRANSMISSION REPETITION TECHNIQUES IN WIRELESS COMMUNICATIONS

(71) Applicant: QUALCOMM Incorporated, San Diego, CA (US)

(72) Inventors: Wei Yang, San Diego, CA (US); Gokul Sridharan, Sunnyvale, CA (US); Hung Dinh Ly, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,545

(22) Filed: Apr. 12, 2024

(65) Prior Publication Data
US 2024/0349276 A1    Oct. 17, 2024

Related U.S. Application Data

(63) Continuation of application No. 17/210,193, filed on Mar. 23, 2021, now Pat. No. 11,968,662.

(51) Int. Cl.
*H04W 72/1268* (2023.01)
*H04L 1/1607* (2023.01)
*H04W 72/23* (2023.01)

(52) U.S. Cl.
CPC ....... *H04W 72/1268* (2013.01); *H04L 1/1607* (2013.01); *H04W 72/23* (2023.01)

(58) Field of Classification Search
CPC . H04W 72/1268; H04W 72/23; H04W 72/14; H04L 1/1607
See application file for complete search history.

(56) References Cited

U.S. PATENT DOCUMENTS

2019/0165895 A1*   5/2019   Kim ..................... H04W 28/18
2019/0230689 A1*   7/2019   Cao .................... H04L 27/2602
(Continued)

FOREIGN PATENT DOCUMENTS

CN    109842952 A  *  6/2019   ........... H04L 1/1816
EP      3661290 A1      6/2020
(Continued)

OTHER PUBLICATIONS

International Preliminary Report on Patentability—PCT/US2022/017957—The International Bureau of WIPO—Geneva, Switzerland—Oct. 5, 2023.
(Continued)

*Primary Examiner* — Saad A. Waqas
(74) *Attorney, Agent, or Firm* — Holland & Hart LLP

(57) ABSTRACT

Methods, systems, and devices for wireless communications are described in which a user equipment (UE) may be configured with periodic uplink grants that provide a number of repetitions and a redundancy version (RV) sequence for the repetitions. Prior to the start of an uplink grant period, the UE may determine a set of slots that are available for uplink transmissions in the uplink grant period. Based on the set of slots, the UE may determine a corresponding RV for repetitions of the uplink communication associated with each slot. The slots with uplink transmissions within the uplink grant period may be non-contiguous. Repetitions of an uplink communication may be configured to be transmitted across multiple uplink grant periods, which may be triggered based on a threshold value associated with the repetitions.

20 Claims, 23 Drawing Sheets

(56) References Cited

U.S. PATENT DOCUMENTS

2021/0282137 A1\* 9/2021 Wang .................... H04L 5/0055
2021/0400714 A1\* 12/2021 Huang .................. H04W 72/23
2022/0312442 A1   9/2022 Yang et al.

FOREIGN PATENT DOCUMENTS

| EP | 3694285 A1 | 8/2020 | |
| EP | 3694285 B1 \* | 5/2021 | ........... H04L 5/0044 |
| KR | 20220020938 A \* | 2/2022 | |
| WO | WO-2020167238 A1 \* | 8/2020 | ............... H04L 1/08 |
| WO | WO-2021067879 A1 \* | 4/2021 | ........... H04L 1/1812 |
| WO | WO-2022186230 A1 \* | 9/2022 | |

OTHER PUBLICATIONS

International Search Report and Written Opinion—PCT/US2022/017957—ISA/EPO—May 23, 2022.

\* cited by examiner

UPLINK CONFIGURED GRANT TRANSMISSION REPETITION TECHNIQUES IN WIRELESS COMMUNICATIONS

FIELD OF TECHNOLOGY

The following relates to wireless communications, including uplink configured grant transmission repetition techniques in wireless communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, periodic communications between devices, such as between a base station and a UE, may be used to exchange information over a period of time. For example, a device may report information according to a set schedule, which may necessitate communications according to a set periodicity. In some cases, in order to help reduce signaling overhead associated with separately signaling a resource grant for each such periodic transmission, an uplink grant may cover multiple uplink transmission occasions, which may in some cases be referred to as a configured grant or a semi-persistent scheduling (SPS) configuration. A UE may then transmit uplink data on multiple occasions using the uplink grant. Efficient techniques for configuring and performing such uplink transmissions may help to enhance network efficiency and reliability.

SUMMARY

The described techniques relate to improved methods, systems, devices, and apparatuses that support uplink configured grant transmission repetition techniques in wireless communications. In accordance with various aspects, described techniques provide for repetitions of uplink communications in which an initial communication may occur subsequent to an initial uplink resource within an uplink grant period, repetitions of the uplink communication may use uplink resources that occupy non-contiguous resources, or repetitions of the uplink communication may span multiple uplink grant periods. In some cases, a UE may determine a number of slots that are available in an uplink grant period and that are available to provide multiple repetitions of the uplink communication. Based on the number of slots that are available, the UE may determine a corresponding redundancy version (RV) for an uplink communication associated with each slot (e.g., based on a configured RV sequence of the uplink grant period). In some cases, if uplink data arrives from an upper layer of the UE during an uplink grant period, the UE may start transmitting repetitions based on available starting RV values in the configured RV sequence. Further, in cases where the uplink resources span non-contiguous slots within the uplink grant period, the RV values for the uplink slots may be determined based on the RV sequence an available uplink slots.

Additionally or alternatively, the UE may determine feedback process IDs for the uplink communication based on a starting symbol of a first transmission occasion of an uplink grant period irrespective of whether the starting symbol actually contains an uplink transmission, or based on starting symbol that is actually used to transmit an initial instance of the uplink transmission. Further, in some cases, the UE may be configured to provide uplink control information (UCI) to the base station, and a scheduled UCI may be transmitted in an uplink control channel (e.g., a physical uplink control channel (PUCCH)) transmission if an uplink transmission or repetition is not present in a slot, and transmitted in an uplink shared channel (e.g., a physical uplink shared channel (PUSCH)) transmission (e.g., using UCI piggybacking) if an uplink transmission or repetition is present in the slot.

Additionally or alternatively, repetitions of an uplink communication may span across multiple uplink grant periods. In some cases, the uplink repetitions may span multiple uplink grant periods based on a threshold value configured for the uplink repetitions, such as a number of repetitions that were transmitted in a previous uplink grant period, a periodicity of the uplink grant periods, a number of available slots for uplink communication repetitions, or any combinations thereof.

A method for wireless communication at a user equipment (UE) is described. The method may include receiving, from a base station, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values, determining a first set of slots for transmitting a first set of repetitions of a first uplink communication within a first uplink grant period of the set of multiple uplink grant periods, where slots of the first set of slots contain available resources to transmit repetitions of the first set of repetitions, and where an associated redundancy version value for each slot of the first set of slots is based on the sequence of redundancy version values, and transmitting the first set of repetitions of the first uplink communication to the base station in the first uplink grant period.

An apparatus for wireless communication at a UE is described. The apparatus may include a processor, memory coupled with the processor, and instructions stored in the memory. The instructions may be executable by the processor to cause the apparatus to receive, from a base station, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values, determine a first set of slots for transmitting a first set of repetitions of a first uplink communication within a first uplink grant period of the set of multiple uplink grant periods, where slots of the first set of slots contain available resources to transmit repetitions of the first set of repetitions, and where an associated redundancy version value for each slot of the first set of slots is based on the sequence of redundancy version values, and transmit the first set of repetitions of the first uplink communication to the base station in the first uplink grant period.

Another apparatus for wireless communication at a UE is described. The apparatus may include means for receiving, from a base station, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values, means for determining a first set of slots for transmitting a first set of repetitions of a first uplink communication within a first uplink grant period of the set of multiple uplink grant periods, where slots of the first set of slots contain available resources to transmit repetitions of the first set of repetitions, and where an associated redundancy version value for each slot of the first set of slots is based on the sequence of redundancy version values, and means for transmitting the first set of repetitions of the first uplink communication to the base station in the first uplink grant period.

A non-transitory computer-readable medium storing code for wireless communication at a UE is described. The code may include instructions executable by a processor to receive, from a base station, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values, determine a first set of slots for transmitting a first set of repetitions of a first uplink communication within a first uplink grant period of the set of multiple uplink grant periods, where slots of the first set of slots contain available resources to transmit repetitions of the first set of repetitions, and where an associated redundancy version value for each slot of the first set of slots is based on the sequence of redundancy version values, and transmit the first set of repetitions of the first uplink communication to the base station in the first uplink grant period.

In some examples of the method, apparatuses, and non-transitory computer-readable medium described herein, the first set of slots for the first set of repetitions may be non-contiguous slots within the first uplink grant period. Some examples of the method, apparatuses, and non-transitory computer-readable medium described herein may further include operations, features, means, or instructions for identifying, during the first uplink grant period, data to be transmitted in the first uplink communication and determining an initial slot for an initial repetition of the first set of repetitions that is subsequent to a starting slot of the first set of slots, where the initial slot is based on one or more available transmission starting locations within the sequence of redundancy version values, and where a number of repetitions of the first uplink communication is based on an indication in the grant, a number of available starting locations, a location of the initial slot within the first set of slots, or any combinations thereof.

Some examples of the method, apparatuses, and non-transitory computer-readable medium described herein may further include operations, features, means, or instructions for receiving, from the base station, an indication to enable repetition deferral to transmit one or more of the repetitions and where an initial slot for the first uplink communication is an earliest slot of the first set of slots. Some examples of the method, apparatuses, and non-transitory computer-readable medium described herein may further include operations, features, means, or instructions for receiving, from the base station, a repetition configuration that indicates that repetitions start from an initial slot of the first set of slots or that indicates that repetitions can start at any slot of the first set of slots that has an initial redundancy version value of the sequence of redundancy version values. Some examples of the method, apparatuses, and non-transitory computer-readable medium described herein may further include operations, features, means, or instructions for receiving, from the base station, a repetition configuration that indicates that a subset of the first set of slots may be available for an initial repetition of the uplink communication, where the subset of the first set of slots include an initial portion of the first set of slots that have an initial redundancy version value of the sequence of redundancy version values.

In some examples of the method, apparatuses, and non-transitory computer-readable medium described herein, an initial slot of the first set of slots may be subsequent to an earliest slot of the first uplink grant period, and where the sequence of redundancy version values starts at the earliest slot of the first uplink grant period and the initial slot uses a redundancy version value from the sequence of redundancy version values that corresponds to a location of the initial slot relative to the earliest slot of the first uplink grant period. In some examples of the method, apparatuses, and non-transitory computer-readable medium described herein, an initial slot of the first set of slots may be subsequent to an earliest slot of the first uplink grant period, and where the sequence of redundancy version values starts at the initial slot of the first set of slots. In some examples of the method, apparatuses, and non-transitory computer-readable medium described herein, a feedback process identification for the first uplink communication may be based on a first symbol of a first slot of the first uplink grant period irrespective of whether the first slot of the first uplink grant period includes a repetition of the first uplink communication. In some examples of the method, apparatuses, and non-transitory computer-readable medium described herein, a feedback process identification for the first uplink communication may be based on a first symbol of an earliest slot of the first uplink grant period that includes a repetition of the first uplink communication.

Some examples of the method, apparatuses, and non-transitory computer-readable medium described herein may further include operations, features, means, or instructions for transmitting a second set of repetitions of the first uplink communication to the base station in a second uplink grant period that is subsequent to the first uplink grant period. In some examples of the method, apparatuses, and non-transitory computer-readable medium described herein, the second set of repetitions may be transmitted based on a threshold value associated with the first uplink grant period, and where the threshold value corresponds to a number of repetitions available in the first uplink grant period, a periodicity of uplink grant periods, a number of available slots for uplink grant repetitions within the one or more uplink grant periods, or any combinations thereof.

Some examples of the method, apparatuses, and non-transitory computer-readable medium described herein may further include operations, features, means, or instructions for transmitting an uplink control information communication to the base station in a predetermined slot that is configured for uplink control information, irrespective of whether the predetermined slot may be in the first set of slots. In some examples of the method, apparatuses, and non-transitory computer-readable medium described herein, the uplink control information may be multiplexed with a repetition of the first set of repetitions when the predetermined slot is in the first set of slots and the uplink control information may be not multiplexed with a repetition of the first set of repetitions when the predetermined slot is not in the first set of slots.

A method for wireless communication at a UE is described. The method may include receiving, from a base station, configuration information for an uplink grant that provides periodic resources for a set of multiple uplink grant periods, where the uplink grant indicates that a set of repetitions of an uplink communication are to be transmitted by the UE to the base station, obtaining, during a first uplink grant period of the set of multiple uplink grant periods, data to be transmitted in a first uplink communication to the base station, transmitting a first subset of a first set of repetitions of the first uplink communication to the base station in the first uplink grant period, and transmitting a second subset of the first set of repetitions of the first uplink communication to the base station in a second uplink grant period.

An apparatus for wireless communication at a UE is described. The apparatus may include a processor, memory coupled with the processor, and instructions stored in the memory. The instructions may be executable by the processor to cause the apparatus to receive, from a base station, configuration information for an uplink grant that provides periodic resources for a set of multiple uplink grant periods, where the uplink grant indicates that a set of repetitions of an uplink communication are to be transmitted by the UE to the base station, obtain, during a first uplink grant period of the set of multiple uplink grant periods, data to be transmitted in a first uplink communication to the base station, transmit a first subset of a first set of repetitions of the first uplink communication to the base station in the first uplink grant period, and transmit a second subset of the first set of repetitions of the first uplink communication to the base station in a second uplink grant period.

Another apparatus for wireless communication at a UE is described. The apparatus may include means for receiving, from a base station, configuration information for an uplink grant that provides periodic resources for a set of multiple uplink grant periods, where the uplink grant indicates that a set of repetitions of an uplink communication are to be transmitted by the UE to the base station, means for obtaining, during a first uplink grant period of the set of multiple uplink grant periods, data to be transmitted in a first uplink communication to the base station, means for transmitting a first subset of a first set of repetitions of the first uplink communication to the base station in the first uplink grant period, and means for transmitting a second subset of the first set of repetitions of the first uplink communication to the base station in a second uplink grant period.

A non-transitory computer-readable medium storing code for wireless communication at a UE is described. The code may include instructions executable by a processor to receive, from a base station, configuration information for an uplink grant that provides periodic resources for a set of multiple uplink grant periods, where the uplink grant indicates that a set of repetitions of an uplink communication are to be transmitted by the UE to the base station, obtain, during a first uplink grant period of the set of multiple uplink grant periods, data to be transmitted in a first uplink communication to the base station, transmit a first subset of a first set of repetitions of the first uplink communication to the base station in the first uplink grant period, and transmit a second subset of the first set of repetitions of the first uplink communication to the base station in a second uplink grant period.

In some examples of the method, apparatuses, and non-transitory computer-readable medium described herein, the second subset of the first set of repetitions may be transmitted based on a threshold value associated with the first uplink grant period. In some examples of the method, apparatuses, and non-transitory computer-readable medium described herein, the threshold value corresponds to a number of repetitions available in the first uplink grant period, a periodicity of uplink grant periods, a number of available slots for uplink grant repetitions within the one or more uplink grant periods, or any combinations thereof. Some examples of the method, apparatuses, and non-transitory computer-readable medium described herein may further include operations, features, means, or instructions for receiving, from the base station, an indication to enable repetition deferral to transmit one or more repetitions in non-contiguous slots.

In some examples of the method, apparatuses, and non-transitory computer-readable medium described herein, a first set of slots for the first set of repetitions may be non-contiguous slots within the first uplink grant period, and an associated redundancy version value of each slot of the first set of slots may be based on a sequence of redundancy version values associated with the first set of repetitions. In some examples of the method, apparatuses, and non-transitory computer-readable medium described herein, an initial slot of the first set of slots for the first set of repetitions may be subsequent to an earliest slot of the first uplink grant period, and where the sequence of redundancy version is determined based on the earliest slot of the first uplink grant period or the initial slot of the first set of slots. In some examples of the method, apparatuses, and non-transitory computer-readable medium described herein, a feedback process identification for the first uplink communication may be based on a first symbol of an earliest slot of the first uplink grant period that includes a repetition of the first uplink communication.

Some examples of the method, apparatuses, and non-transitory computer-readable medium described herein may further include operations, features, means, or instructions for transmitting an uplink control information communication to the base station in a predetermined slot of the first uplink grant period that may be configured for uplink control information, where the uplink control information is transmitted in a control channel or is multiplexed with a repetition of the first uplink communication based on whether the predetermined slot includes a repetition of the first uplink communication.

A method for wireless communication at a base station is described. The method may include transmitting, to a UE, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values and receiving a first set of repetitions of a first uplink communication from the UE in a first uplink grant period of the set of multiple uplink grant periods, where a first set of slots for the first set of repetitions are within the first uplink grant period, and the associated redundancy version value of each slot of the first set of slots is based on the sequence of redundancy version values.

An apparatus for wireless communication at a base station is described. The apparatus may include a processor, memory coupled with the processor, and instructions stored in the memory. The instructions may be executable by the processor to cause the apparatus to transmit, to a UE, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values and receive a first set of repetitions of a first uplink communication from the UE in a first uplink grant period of the set of multiple uplink grant periods, where a first set of slots for the first set of repetitions are within the first uplink grant period, and the associated redundancy version value of each slot of the first set of slots is based on the sequence of redundancy version values.

Another apparatus for wireless communication at a base station is described. The apparatus may include means for transmitting, to a UE, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values and means for receiving a first set of repetitions of a first uplink communication from the UE in a first uplink grant period of the set of multiple uplink grant periods, where a first set of slots for the first set of repetitions are within the first uplink grant period, and the associated redundancy version value of each slot of the first set of slots is based on the sequence of redundancy version values.

A non-transitory computer-readable medium storing code for wireless communication at a base station is described. The code may include instructions executable by a processor to transmit, to a UE, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values and receive a first set of repetitions of a first uplink communication from the UE in a first uplink grant period of the set of multiple uplink grant periods, where a first set of slots for the first set of repetitions are within the first uplink grant period, and the associated redundancy version value of each slot of the first set of slots is based on the sequence of redundancy version values.

Some examples of the method, apparatuses, and non-transitory computer-readable medium described herein may further include operations, features, means, or instructions for transmitting, to the UE, an indication to enable repetition deferral for transmission of one or more of the repetitions in non-contiguous slots. In some examples of the method, apparatuses, and non-transitory computer-readable medium described herein, an initial slot of the first set of slots for the first set of repetitions may be subsequent to an earliest slot of the first uplink grant period, and where the sequence of redundancy version is determined based on the earliest slot of the first uplink grant period or the initial slot of the first set of slots. In some examples of the method, apparatuses, and non-transitory computer-readable medium described herein, a feedback process identification for the first uplink communication may be based on a first symbol of an earliest slot of the first uplink grant period that includes a repetition of the first uplink communication.

Some examples of the method, apparatuses, and non-transitory computer-readable medium described herein may further include operations, features, means, or instructions for receiving a second set of repetitions of the first uplink communication from the UE in a second uplink grant period that is subsequent to the first uplink grant period based on a threshold value associated with the first uplink grant period and where the threshold value corresponds to a number of repetitions available in the first uplink grant period, a periodicity of uplink grant periods, a number of available slots for uplink grant repetitions within the one or more uplink grant periods, or any combinations thereof.

Some examples of the method, apparatuses, and non-transitory computer-readable medium described herein may further include operations, features, means, or instructions for receiving an uplink control information communication from the UE in a predetermined slot of the first uplink grant period that is configured for uplink control information, where the uplink control information is transmitted in a control channel or is multiplexed with a repetition of the first uplink communication based on whether the predetermined slot includes a repetition of the first uplink communication.

DETAILED DESCRIPTION

Figure 1:
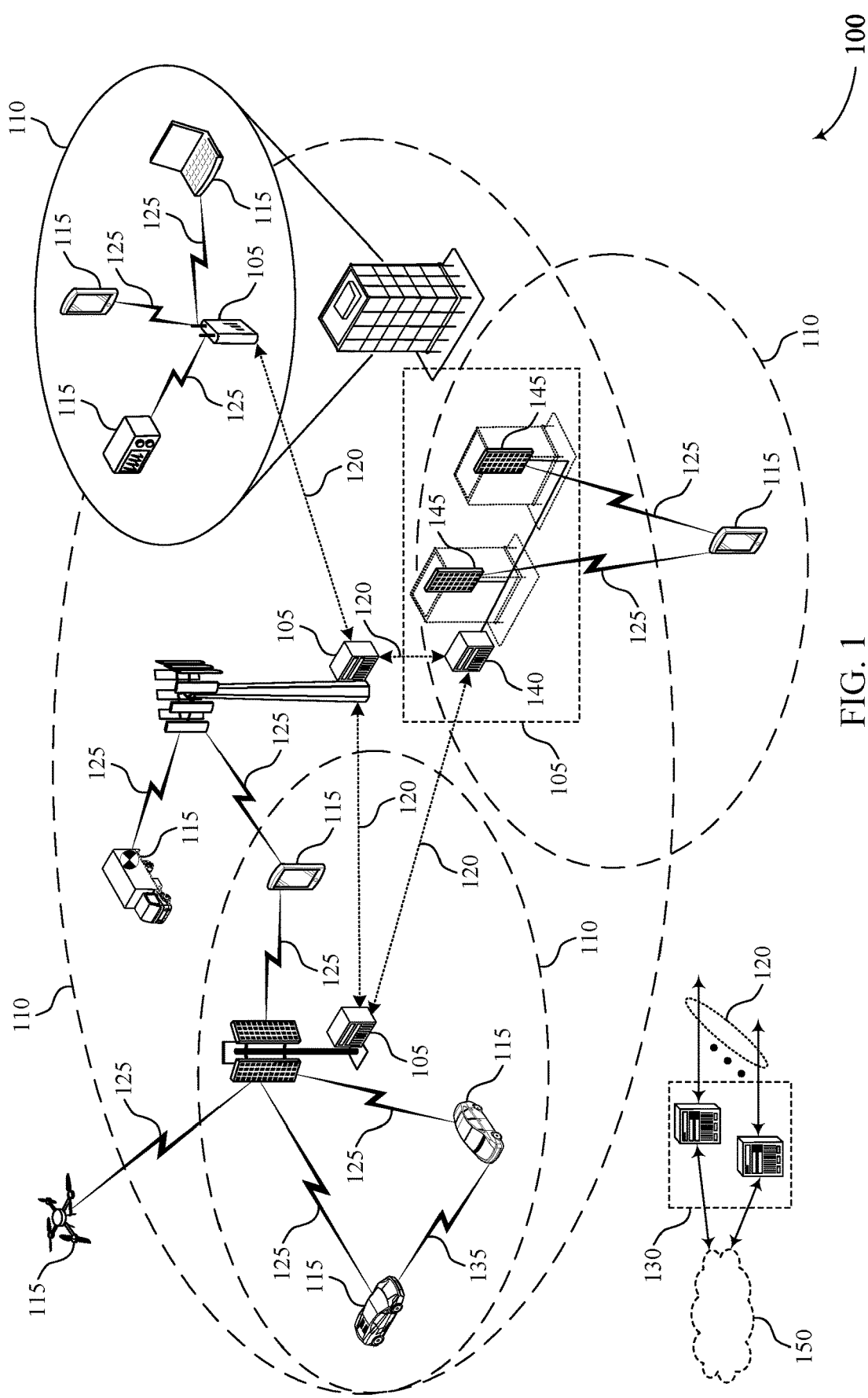
FIG. 1 illustrates an example of a wireless communications system that supports uplink configured grant transmission repetition techniques in wireless communications in accordance with aspects of the present disclosure.

Various aspects of the present disclosure relate to configuration and utilization of uplink grants that may provide periodic resources for uplink transmission. Such uplink grants may provide for periodic communications between devices, such as between a base station and a user equipment (UE), which may be used to exchange information over a period of time. For example, a device may report information according to a set schedule, which may necessitate communications according to a set periodicity. In some cases, the uplink grants of periodic resources may be provided in a configuration of semi-persistent scheduling (SPS) resources or a configuration of a configured grant with periodic resources for uplink transmissions from a UE to a base station. In cases where a UE is provided with a configured grant, the associated uplink resources may be enabled with a downlink control information (DCI) transmission (e.g., an activation DCI), and the UE may use the configured resources for uplink transmissions, which can save substantial overhead compared with providing a separate grant for each instance of the periodic transmissions (e.g., particularly if the uplink transmissions contain relatively small amounts of data).

In some cases, such uplink grants of periodic resources may include sufficient resources to provide for coverage enhancement such as through multiple repetitions of an uplink communication. For example, the UE may be configured to transmit four repetitions of an uplink communication, which may include an initial transmission of the uplink communication and three retransmissions of the uplink communication. In some cases resources of a periodic uplink grant may conflict with one or more downlink symbols that are configured by a base station. For example, a configured grant repetition may conflict with semi-static downlink symbols, synchronization signal block (SSB) symbols, control resource set (CORESET) symbols, and the like. In accordance with existing techniques for repetitions of transmissions using periodic uplink grant resources, the UE would drop such repetitions that have conflicting resources with downlink symbols. However, such dropping of repetitions may result in reduction in reliability of communications, which may reduce network efficiency in cases where a communication is not successfully received at the base station. In accordance with various techniques as discussed herein, repetitions of an uplink communication may be transmitted such that a desired number of repetitions are transmitted and thereby reliability of communications may be enhanced. In some cases, the UE may defer a configured grant a PUSCH transmission or repetition until a next available slot in cases where transmission/repetition is not able to be transmitted due to a conflicting downlink symbol.

In some cases, a periodic uplink grant or uplink configured grant may be configured with a number of repetitions (e.g., K repetitions), such as 1, 2, 4, or 8 repetitions (e.g., that may be configured by a parameter repK). The periodic uplink grant of uplink configured grant may also provide a RV sequence (e.g., that is configured by parameter repK-RV), such as an RV sequence of {0231, 0303, or 0000} for cases where repK>1. In such cases, the $n^{th}$ transmission occasion uses the $(mod (n-1,4)+1)^{th}$ value in the RV sequence. In some cases, an initial transmission of a set of repetitions of an uplink communication may start at a particular available starting RV value, such as at an occasion corresponding to RV 0 (e.g., resulting in an initial transmission occasion of the K repetitions if the configured RV sequence is {0, 2, 3, 1}; resulting in any of the transmission occasions of the K repetitions that are associated with RV=0 if the configured RV sequence is {0, 3, 0, 3}; or resulting in any of the transmission occasions of the K repetitions if the configured RV sequence is {0, 0, 0, 0}, except the last transmission occasion when K≥8). In some existing deployments, such repetitions may be across slots only and be terminated based on certain conditions, such as after K repetitions, or if any repetitions would have crossed into the next uplink grant period, if cancelled by a dynamic grant (indicating the same feedback process as the ongoing repetition). Further, in such deployments, a repetition may not be transmitted if it overlaps with SSB symbols or symbols indicated as downlink (e.g., by tdd-UL-DL-Configuration-Common or tdd-UL-DL-ConfigurationDedicated).

As discussed in accordance with various aspects herein, described techniques provide for repetitions of uplink communications in which an initial communication may occur subsequent to an initial uplink resource within an uplink grant period, repetitions of the uplink communication may use uplink resources that span non-contiguous resources, or repetitions of the uplink communication may span multiple uplink grant periods. In some cases, prior to the start of an uplink grant period, a UE may determine a number of slots that are available in the uplink grant period and that are available to provide multiple repetitions of the uplink communication. Based on the number of slots that are available, the UE may determine a corresponding redundancy version (RV) for an uplink communication associated with each slot that is available for an uplink transmission (e.g., based on a configured RV sequence of the uplink grant period).

In some cases, if uplink data arrives from an upper layer of the UE during an uplink grant period, the UE may start transmitting repetitions based on available starting RV values in the configured RV sequence. Further, in cases where the uplink resources span non-contiguous slots within the uplink grant period (e.g., due to a TDD configuration having one or more downlink slots within the uplink grant period, the presence of SSB or CORESET symbol in a slot, etc.), the RV values for the uplink slots may be determined based on the RV sequence of the available uplink slots.

In some cases, repetitions of an uplink communication may each be associated with a same feedback process identification (ID), such as a hybrid automatic repeat request (HARQ) process ID. In some aspects, a UE may determine a feedback process ID for the uplink communication based on a starting symbol of a first transmission occasion of an uplink grant period irrespective of whether the starting symbol actually contains an uplink transmission. Alternatively, in some aspects the UE may determine the feedback process ID for the uplink communication based on a starting symbol that is actually used to transmit an initial instance of the uplink transmission.

Further, in some cases, the UE may be configured to provide uplink control information (UCI) to the base station. Such a scheduled UCI may be transmitted in an uplink control channel (e.g., a physical uplink control channel (PUCCH)) transmission if an uplink transmission or repetition is not present in a slot. In the event that an uplink transmission or repetition is present in a same slot as the scheduled UCI, the UCI may be transmitted in an uplink shared channel (e.g., a physical uplink shared channel (PUSCH)) transmission (e.g., using UCI piggybacking).

Additionally, or alternatively, in some aspects of the present disclosure, repetitions of an uplink communication may be configured to be transmitted across multiple uplink grant periods. In some cases, the uplink repetitions may span multiple uplink grant periods based on a threshold value configured for the uplink repetitions. The threshold value may be associated with, for example, a number of repetitions that were transmitted in a previous uplink grant period, a periodicity of the uplink grant periods, a number of available slots for uplink communication repetitions, or any combinations thereof.

Techniques such as discussed herein thus provide for flexible configuration of repetitions of uplink communications within one or more uplink grant periods. In cases where uplink slots within an uplink grant period are non-contiguous, or start after an initial slot of the uplink grant period, techniques allow for one or more repetitions to be deferred to later one or more later slots and thus an indicated number of repetitions may be transmitted, thereby enhancing reliability. Further, UCI and HARQ process IDs may be unambiguously transmitted in cases where one or multiple repetitions are deferred by one or more slots, allowing for efficient communications. Such techniques may help reduce latency (e.g., through reduced need for retransmissions based on HARQ feedback), enhance reliability, and reduce overhead in a wireless communications system.

Aspects of the disclosure are initially described in the context of wireless communications systems. Uplink wireless resources for various exemplary uplink grant periods and process flows are then discussed. Aspects of the disclosure are further illustrated by and described with reference to apparatus diagrams, system diagrams, and flowcharts that relate to uplink configured grant transmission repetition techniques in wireless communications.

FIG. 1 illustrates an example of a wireless communications system 100 that supports uplink configured grant transmission repetition techniques in wireless communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, one or more base stations 105 may configure periodic uplink grants for a UE 115 (e.g., in SPS or a configured grant). Such a periodic uplink grant may be configured with a number of repetitions and a RV sequence. In some cases, prior to the start of an uplink grant period, the UE 115 may determine a set of slots that are available in the uplink grant period and that are available to provide multiple repetitions of the uplink communication. Based on the set of slots, the UE may determine a corresponding RV for repetitions of an uplink communication associated with each slot. In some cases, repetitions of an uplink communication may each be associated with a same feedback process ID that may be determined based on a starting symbol of a first transmission occasion of an uplink grant period or a starting symbol that is actually used to transmit an initial instance of the uplink transmission. Additionally or alternatively, the UE 115 may be configured to provide UCI to the base station in a control channel or shared channel transmission based on whether the associated slot includes a repetition of the uplink communication or not. Further, in some cases, repetitions of an uplink communication may be configured to be transmitted across multiple uplink grant periods, which may be triggered based on a threshold value associated with the repetitions.

Figure 2:
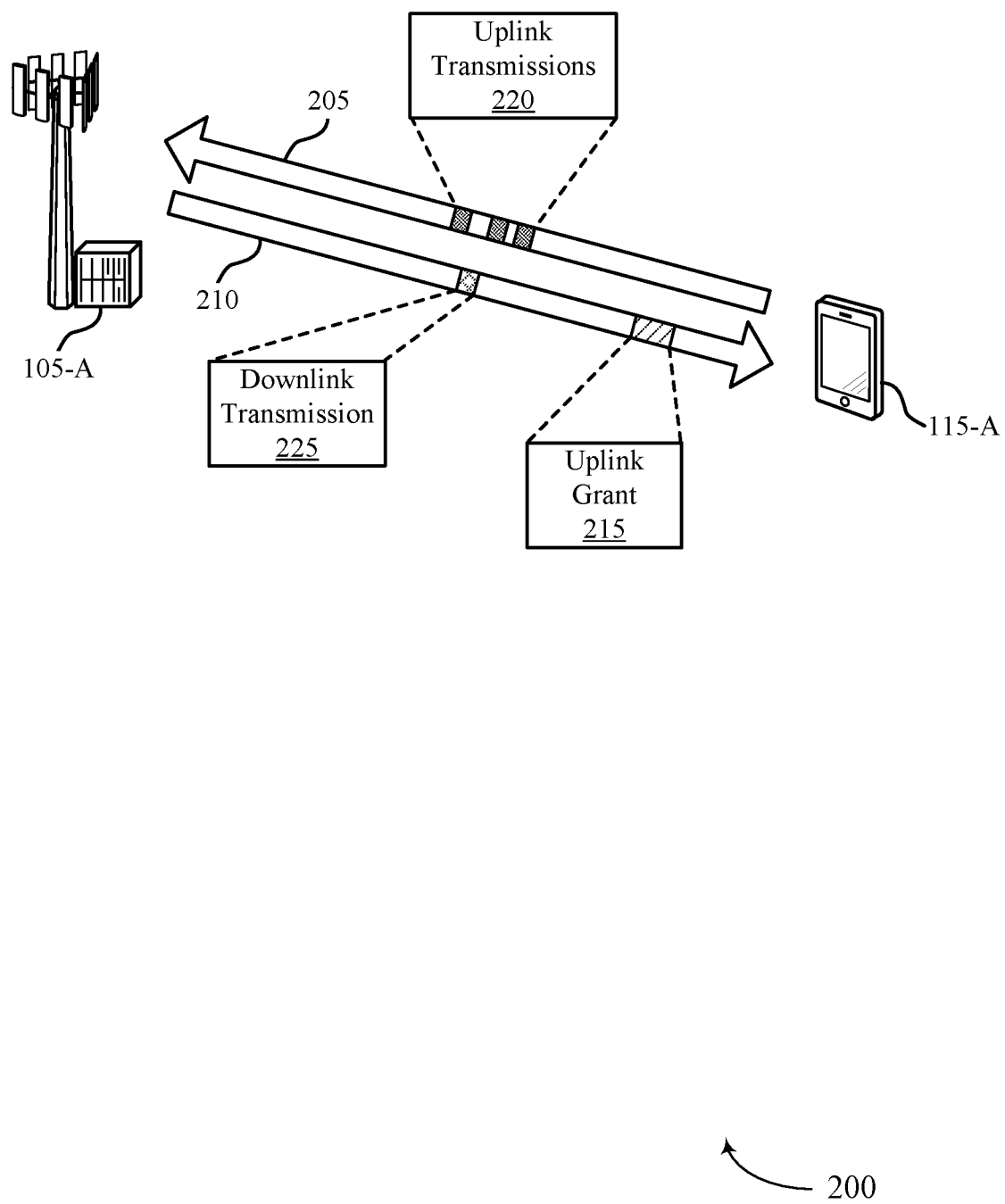
FIG. 2 illustrates an example of a portion of a wireless communications system that supports uplink configured grant transmission repetition techniques in wireless communications in accordance with aspects of the present disclosure.

FIG. 2 illustrates an example of a wireless communications system 200 that supports uplink configured grant transmission repetition techniques in wireless communications in accordance with aspects of the present disclosure. The wireless communications system 200 may include a base station 105-a and a UE 115-a, which may be examples of base stations 105 and UEs 115, respectively, as described with reference to FIG. 1. The UE 115-a and base station 105-a may communicate using communication links (e.g., a Uu link) in which the UE 115-a transmits uplink communications 205 to the base station 105-a, and the base station 105-a transmits downlink communications 210 to the UE 115-a.

In some cases, the base station 105-a may configure the UE 115-a with one or more periodic uplink grants 215 (e.g., a SPS or configured grant). The periodic uplink grants 215 in some cases may provide configured grant resources which may provide uplink resources (e.g., PUSCH resources) for periodic uplink transmissions 220 from the UE 115-a to the base station 105-a according to the configuration. As discussed herein, in some cases at least one downlink transmission 225 of the base station 105-a may conflict with the configured uplink resources, and the UE 115-a may thus be unable to transmit an uplink transmission 220 (e.g., an uplink transmission that contains a repetition of an uplink communication) in such a slot. In some cases, the downlink transmission 225 may be transmitted based on a TDD configuration in which the associated slot is configured as a downlink slot or a special/flexible slot. In some cases, the downlink transmission 225 may be a SSB or CORESET transmission that is transmitted using one or more downlink symbols of a slot.

In accordance with various techniques as discussed herein, the UE 115-a may determine, prior to the start of an uplink grant period, a set of slots that are available in the uplink grant period and that are available to provide multiple repetitions of the uplink communication. Based on the set of slots, the UE 115-a may determine a corresponding RV for repetitions of the uplink communication associated with each slot. In some cases, repetitions of an uplink communication may each be associated with a same feedback process ID that may be determined based on a starting symbol of a first transmission occasion of an uplink grant period or a starting symbol that is actually used to transmit an initial instance of the uplink transmissions 220. Further, in some cases, the UE 115-a may be configured to provide UCI to the base station 105-a in a control channel or shared channel transmission based on whether the associated slot includes a repetition of the uplink communication or not. Further, in some cases, repetitions of an uplink communication may be configured to be transmitted across multiple uplink grant periods, which may be triggered based on a threshold value associated with the repetitions. Various examples of sets of slots of uplink grant periods are discussed with reference to FIGS. 3 through 5.

Figure 3:
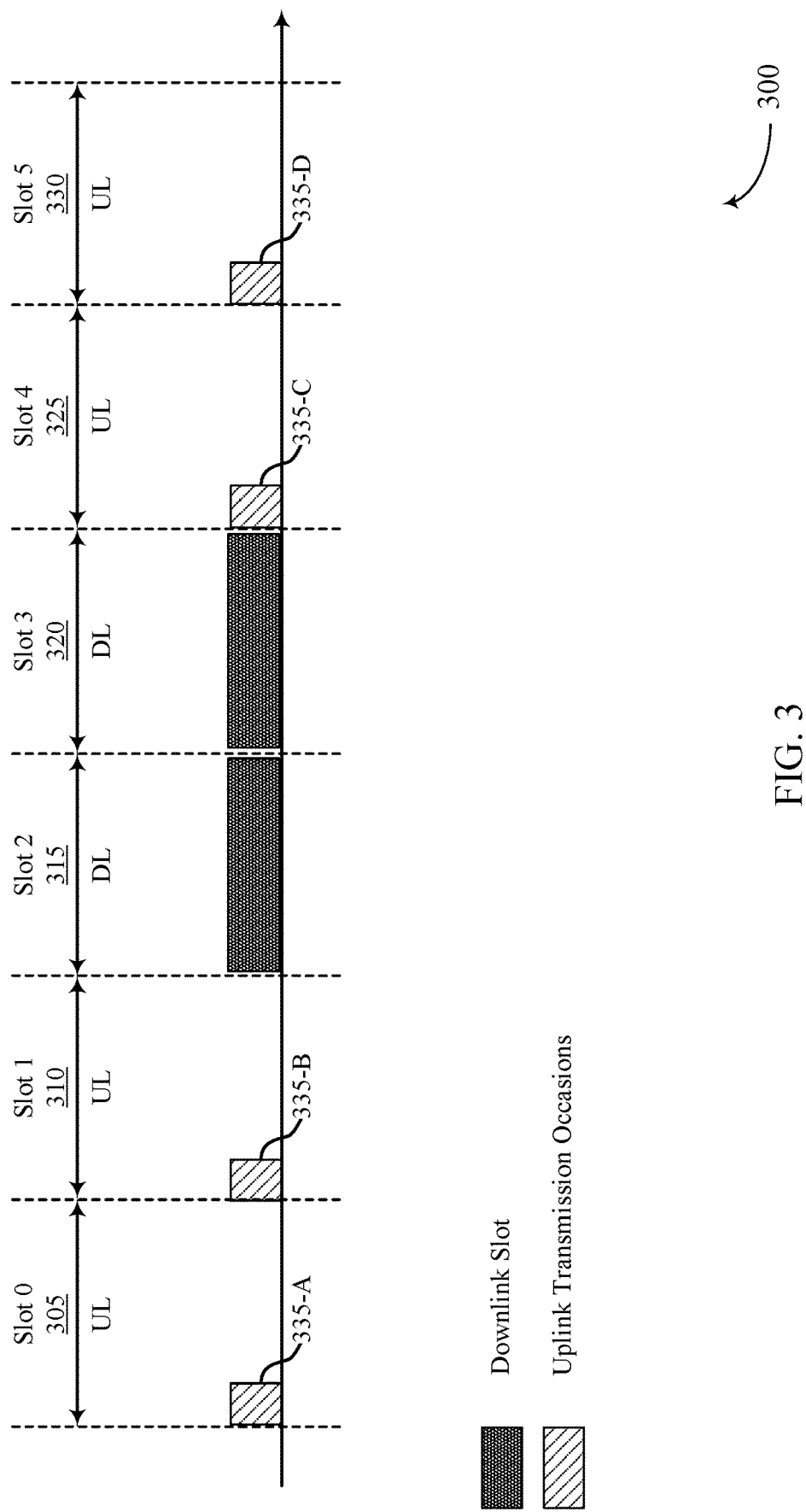
FIGS. 3 through 5 illustrate examples of uplink grant period resources that support uplink configured grant transmission repetition techniques in wireless communications in accordance with aspects of the present disclosure.

FIG. 3 illustrates an example of uplink grant period resources 300 that support uplink configured grant transmission repetition techniques in wireless communications in accordance with aspects of the present disclosure. In this example, a base station (e.g., a base station 105 of FIG. 1 or 2) may provide one or more configured grants to a UE (e.g., a UE 115 of FIG. 1 or 2).

As illustrated in FIG. 3, the uplink grant period resources 300 may include a set of slots that include a first slot 305 (slot 0), a second slot 310 (slot 1), a third slot 315 (slot 2), a fourth slot 320 (slot 3), a fifth slot 325 (slot 4), and a sixth slot 330 (slot 5). The UE may be configured with uplink resources within each slot of the uplink grant period resources 300, each of which represent an uplink transmission occasion 335. In this example, two of the slots of the uplink grant period resources 300 are configured as downlink slots, namely the third slot 315 and the fourth slot 320. Thus, in this example, the first slot 305 may include a first uplink transmission occasion 335-a, the second slot 310 may include a second uplink transmission occasion 335-b, the fifth slot 325 may include a third uplink transmission occasion 335-c, and the sixth slot 330 may include a fourth uplink transmission occasion 335-d. The determination of the uplink transmission occasions 335 may be performed prior to the start of the configured grant period (e.g., prior to the start of the first slot 305 when the first slot 305 is an initial slot of the uplink grant period resources 300). Further, the uplink transmission occasions 335 for the configured grant period remain as determined prior to the start of the configured grant irrespective of data arrival within the configured grant period.

Further, in some cases, as part of the configuration of the uplink grant period resources 300, the UE may be provided with parameters that indicate a number of repetitions (e.g., K repetitions), such as 1, 2, 4, or 8 repetitions (e.g., that may be configured by a parameter repK). The configuration may also provide a RV sequence (e.g., that is configured by parameter repK-RV), such as an RV sequence of {0231, 0303, or 0000} for cases where repK>1.

In some cases, uplink transmissions according to the configuration of the uplink grant period resources 300 may be managed by one or more lower layers at the UE (e.g., PDCP/RLC/MAC/RRC/physical layers), and data from an upper layer (e.g., a MAC layer or application layer) may arrive at the lower layers after one or more slots of the uplink grant period resources 300 (e.g., uplink data arrives in the third slot 315). Further, in this example, some repetitions gets deferred due to TDD conflicts. In some cases, the UE may determine, prior to the configured start time of the uplink grant period resources 300, the K slots that contains available uplink transmission occasions 335 to transmit the K repetitions of the uplink data. Then, the UE may determine the corresponding RVs of each of the K slots. In the example of FIG. 3, if the data arrives in the middle of a repetition (e.g., in the third slot 315), and the configured RV pattern is [0 3 0 3], then the UE may transmit two repetitions of the uplink data, namely a first repetition in the third uplink transmission occasion 335-c and a second repetition in the fourth uplink transmission occasion 335-d, in the fifth slot 325 and the sixth slot 330 with RV 0 and RV 3, respectively. Thus, the number of hypotheses that the base station will need to test for the uplink data are unambiguous and readily identified.

In some cases, the base station may enable (e.g., via RRC configuration or in configuration information provided in a MAC-CE) deferral of configured grant repetitions, and the UE may defer repetitions based on such a configuration. In some cases a repetition configuration to enable or disable deferral for configured grant repetitions may be provided by the base station, that indicates that a same deferral configuration applies to both dynamic grant PUSCH transmissions and configured grant PUSCH transmissions. In some cases, the repetition configuration provide separate parameters to configure the deferral behavior for dynamic grant PUSCH transmissions and configured grant PUSCH transmissions. Further, for configured grant PUSCH transmissions, the repetition configuration that enables or disables the deferral may be configured separately for each of two or more configured grant configurations. For example, in cases where a UE is configured with multiple configured grant configurations that each have different transmission parameters (e.g., periodicity, repetition factor, MCS, etc.), the different configurations may also have different behavior for deferral of repetitions.

In some cases, when deferred repetition is enabled/configured (e.g., for all PUSCH transmissions, or only for a particular configured grant uplink shared channel configuration), the initial transmission of a transport block (TB) may only be started in the first occasion of the K repetitions (e.g., at the first uplink transmission occasion 335-a). Such a starting location for initiating repetitions, in some cases, may be part of the repetition configuration. For example, a base station may configure the UE such that the UE can start a configured grant repetition from any transmission occasion 335 with a RV 0 in order to reduce latency (e.g., in cases where channel conditions are relatively good and detection of the repetition in a slot is relatively reliable). Such a configuration may be desirable for high reliability and low latency communications (e.g. URLLC transmissions), in which a number of repetitions is relatively low and the signal to noise ratio (SNR) is relatively large. In other examples, the base station may configure the UE such that the UE can start a configured grant repetition only in the earliest transmission occasion 335 of the uplink configured grant period. Such a configuration may be desirable in cases where channel conditions are relatively poor and a large number of repetitions may be scheduled in order to have sufficient energy for decoding. In such cases, the base station can use one transmission occasion 335 (e.g., first uplink transmission occasion 335-a) and buffer signals of multiple transmission occasions 335 for more reliable decoding.

In some cases, the base station, as part of the repetition configuration, may configure whether a configured grant repetition always starts from the earliest transmission occasion 335 within the configured grant period, or can start from any transmission occasion 335 that corresponds to RV 0 (e.g., based on channel conditions), thereby allowing the base station to balance detection performance and latency. Additionally, or alternatively, the base station may configure the UE to start a set of repetitions of an uplink communication from any transmission occasion 335 associated with RV 0 based on a number of repetitions (e.g., if number of repetitions is relatively small, such as ≤8, then the UE can start repetitions from any slot with RV0, and if the number of repetitions is relatively large, such as >8, then the UE can only start repetitions from the first transmission occasion).

In further cases, the base station may configure the UE to start configured grant repetitions from a subset of slots, such as from the first X slots that correspond to RV 0, but not all slots that correspond to RV 0. For example, the UE may be configured with a repetition number of 32 and RV sequence of [0, 2, 3, 1]. In this case, the slots that correspond to RV 0 are slots 0, 4, 8, 12, 16, 20, 24, 28. In this example, the UE may start its configured grant repetition only from slots 0, 4, 8, 12 (i.e., the first X=4 slots that corresponds to RV0), and not from slots 16, 20, 24, 28. Thus, if data arrives after slot 12, the UE will to wait until the next configured grant period to begin transmission of the repetitions. In some cases, the value of X may be a specified number (e.g., provided in a standard specification for wireless communications), or it can be configured (e.g., via RRC, MAC-CE) to the UE. In some cases, the base station may configure the UE (e.g., via RRC configuration) whether a configured grant repetition can only start from the first occasion, or it can start from any occasion associated with RV 0, or the UE may determine on its own whether a configured grant repetition can only start from the first occasion or it can start from any occasion associated with RV 0 (e.g., based on the repetition number configured for the configured grant repetition).

Figure 4:
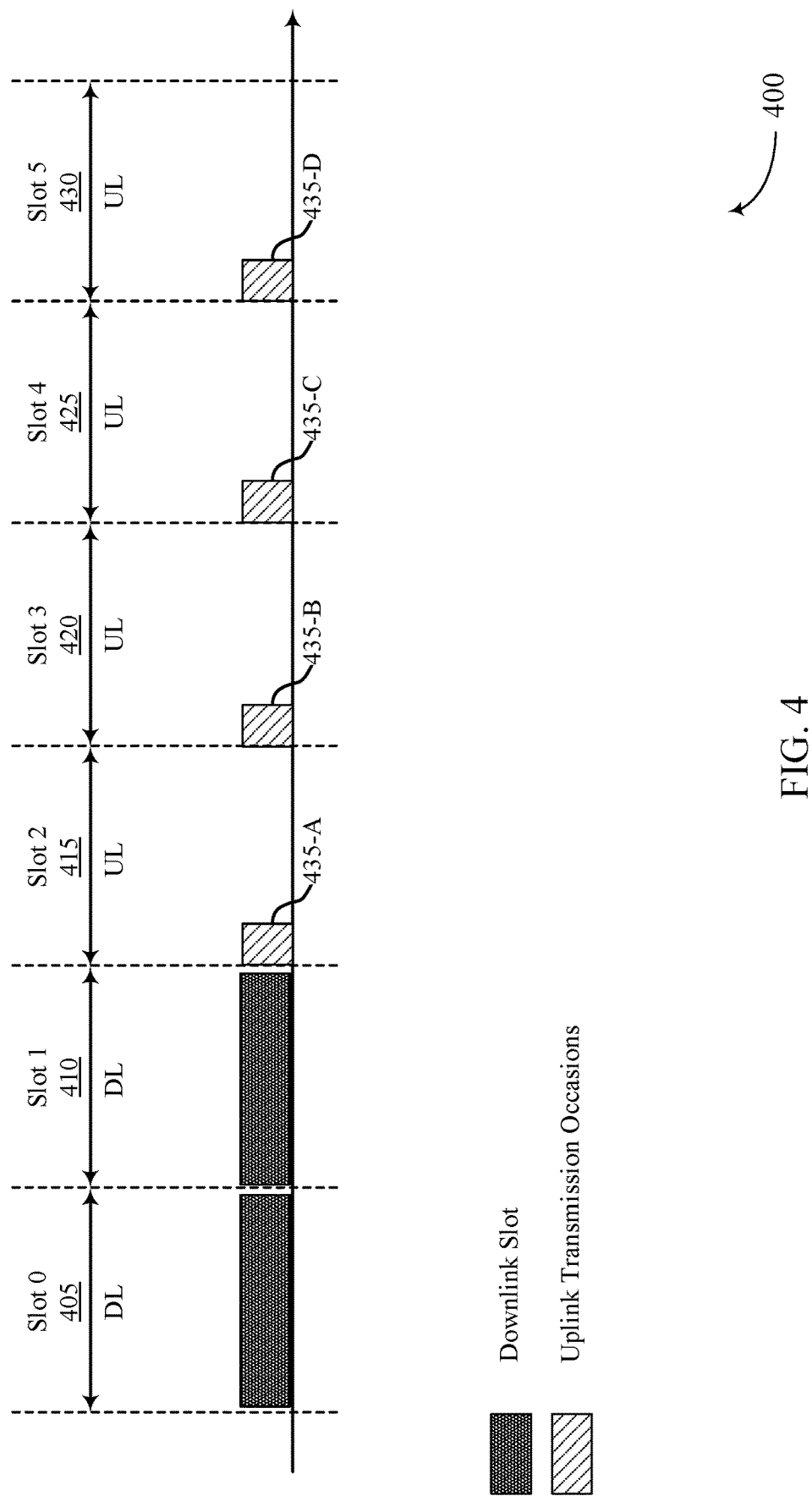

FIG. 4 illustrates another example of uplink grant period resources 400 that support uplink configured grant transmission repetition techniques in wireless communications in accordance with aspects of the present disclosure. Again in this example, a base station (e.g., a base station 105 of FIG. 1 or 2) may provide one or more configured grants to a UE (e.g., a UE 115 of FIG. 1 or 2).

As illustrated in FIG. 4, the uplink grant period resources 400 may include a set of slots that include a first slot 405 (slot 0), a second slot 410 (slot 1), a third slot 415 (slot 2), a fourth slot 420 (slot 3), a fifth slot 425 (slot 4), and a sixth slot 430 (slot 5). The UE may be configured with uplink resources within each slot of the uplink grant period resources 400, each of which represent an uplink transmission occasion 435. In this example, two of the slots of the uplink grant period resources 400 are configured as downlink slots, namely the first slot 405 and the second slot 410. In such a case, the configured grant may be configured to start at the first slot 405, but since the first slot 405 and the second slot 410 are both downlink slots, the first instance of the uplink communication of the configured grant may be after the second slot 410. Thus, in this example, the third slot 415 may include a first uplink transmission occasion 435-*a*, the fourth slot 420 may include a second uplink transmission occasion 435-*b*, the fifth slot 425 may include a third uplink transmission occasion 435-*c*, and the sixth slot 430 may include a fourth uplink transmission occasion 435-*d*.

In some cases, a first repetition of an uplink communication may conflict with a downlink slot, such as the first slot 405. In some cases, the UE may not defer the initial repetition of the uplink communication, and if the initial repetition of the uplink communication is in conflict with a downlink slot, the UE may treat the first repetition as having been transmitted. In other cases, the initial repetition can be deferred, and the UE may determine the slots to transmit the deferred transmissions based on the available uplink slots of the uplink grant period resources 400.

In some cases, the UE may determine feedback process IDs (e.g., HARQ process IDs) associated with the uplink communication. In some cases, the feedback process ID may be determined based on an earliest symbol of the uplink grant period resources 400 in the first slot 405, irrespective of whether there is actually an uplink transmission in the slot. In other cases, the feedback process ID may be determined based on an earliest symbol of the initial configured transmission occasion of the repetition bundle after deferring to an available slot. For example, a HARQ process ID may be determined as:

HARQ Process ID=[floor(CURRENT_symbol/periodicity)]modulo nrofHARQ-Processes+harq-ProcID-Offset2, where for the first option the CURRENT_symbol refers for the first symbol of the first configured transmission occasion of the repetition bundle regardless of whether the first repetition actually take place or not. For the second option, the CURRENT_symbol refers to the first symbol of the first configured transmission occasion of the repetition bundle after deferring the first repetition to an available slot.

In some cases, due to deferrals and a number of available slots for uplink transmissions, the UE may transmit less than K repetitions in a given set of uplink grant period resources 400 (e.g., less than K repetitions of a TB, where K is set to achieve a target reliability metric). Such a situation may occur, for example, due to non-sufficient resources within the period (e.g., when the periodicity is small, or the number of uplink slots is small), due to late data traffic arrival, and the like. In such cases, the repetitions may not provide reliable reception of the TB at the base station. In order to provide a sufficient number of repetitions for combining and reliable decoding at the base station, in some cases a same TB may be transmitted with repetitions that span from one period of uplink grant period resources 400 to a subsequent period of uplink grant period resources 400. In some cases, such cross-period spanning or repetitions may be initiated under one or more conditions, such as if a number of repetitions that were transmitted in a previous period is smaller than a threshold, when a periodicity of the configured uplink grant period resources 400 is smaller than a threshold value, when a number of available slots for uplink communication repetitions is smaller than a threshold value (e.g., regardless of the actual number of transmitted repetitions), or any combinations thereof.

Figure 5:
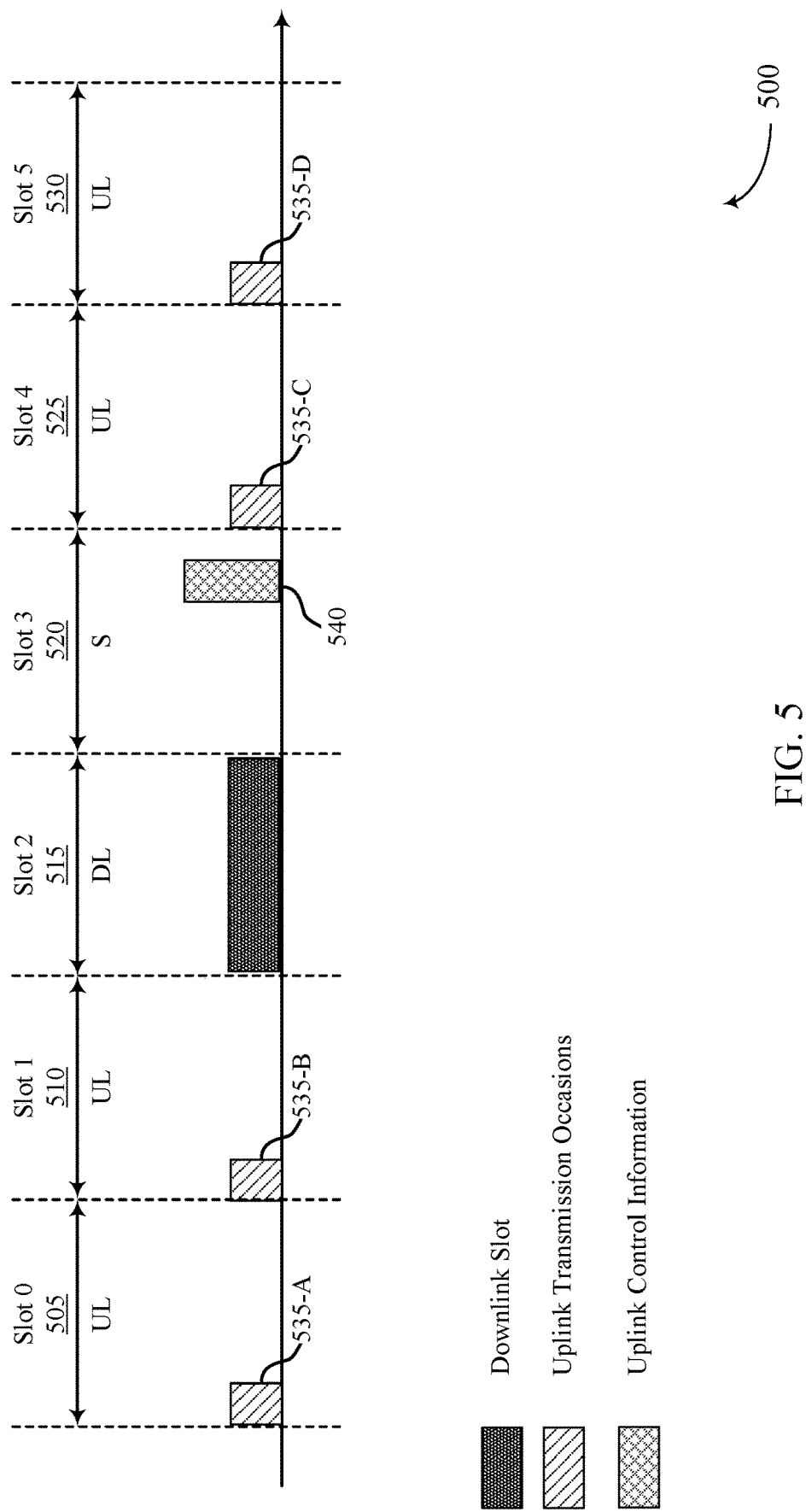

FIG. 5 illustrates another example of uplink grant period resources 500 that support uplink configured grant transmission repetition techniques in wireless communications in accordance with aspects of the present disclosure. Again in this example, a base station (e.g., a base station 105 of FIG. 1 or 2) may provide one or more configured grants to a UE (e.g., a UE 115 of FIG. 1 or 2).

As illustrated in FIG. 5, the uplink grant period resources 500 may include a set of slots that include a first slot 505 (slot 0), a second slot 510 (slot 1), a third slot 515 (slot 2), a fourth slot 520 (slot 3), a fifth slot 525 (slot 4), and a sixth slot 530 (slot 5). The UE may be configured with uplink resources within each slot of the uplink grant period resources 500, each of which represent an uplink transmission occasion 535. In this example, two of the slots of the uplink grant period resources 500 may include one or more downlink symbols or otherwise have a conflict that prevents a repetition of an uplink communication. In this example, the third slot 515 may be a downlink slot, and the fourth slot 520 may include one or multiple downlink symbols that conflict with configured uplink resources (e.g., a SSB transmission). Thus, in this example, the fourth slot 520 may include one or multiple symbols that may be used for uplink communications.

In this example, the UE may be scheduled with a UCI transmission (e.g., a UCI transmission that includes HARQ feedback for one or more downlink transmissions). In some cases, such UCI may be transmitted in slots that carry PUSCH transmission through UCI piggybacking on the PUSCH, or may be transmitted in PUCCH when the slot does not carry PUSCH. In some cases, when a repetition of an uplink communication is deferred by one or multiple slots, the UCI multiplexing may be performed after deferring a repetition of the uplink communication. For example, as illustrated in FIG. 5, a UCI 540 may be scheduled to be transmitted in the fourth slot 520, which in this example is a special slot (e.g., a slot that includes downlink and uplink symbols). As the fourth slot 520 does not contain a PUSCH transmission, UCI piggybacking is not used, and the UCI 540 may be transmitted on PUCCH in the fourth slot 520 (without deferring), and the repetition of the uplink communication that was scheduled on the fourth slot 520 may be deferred until the fifth slot 525.

Figure 6:
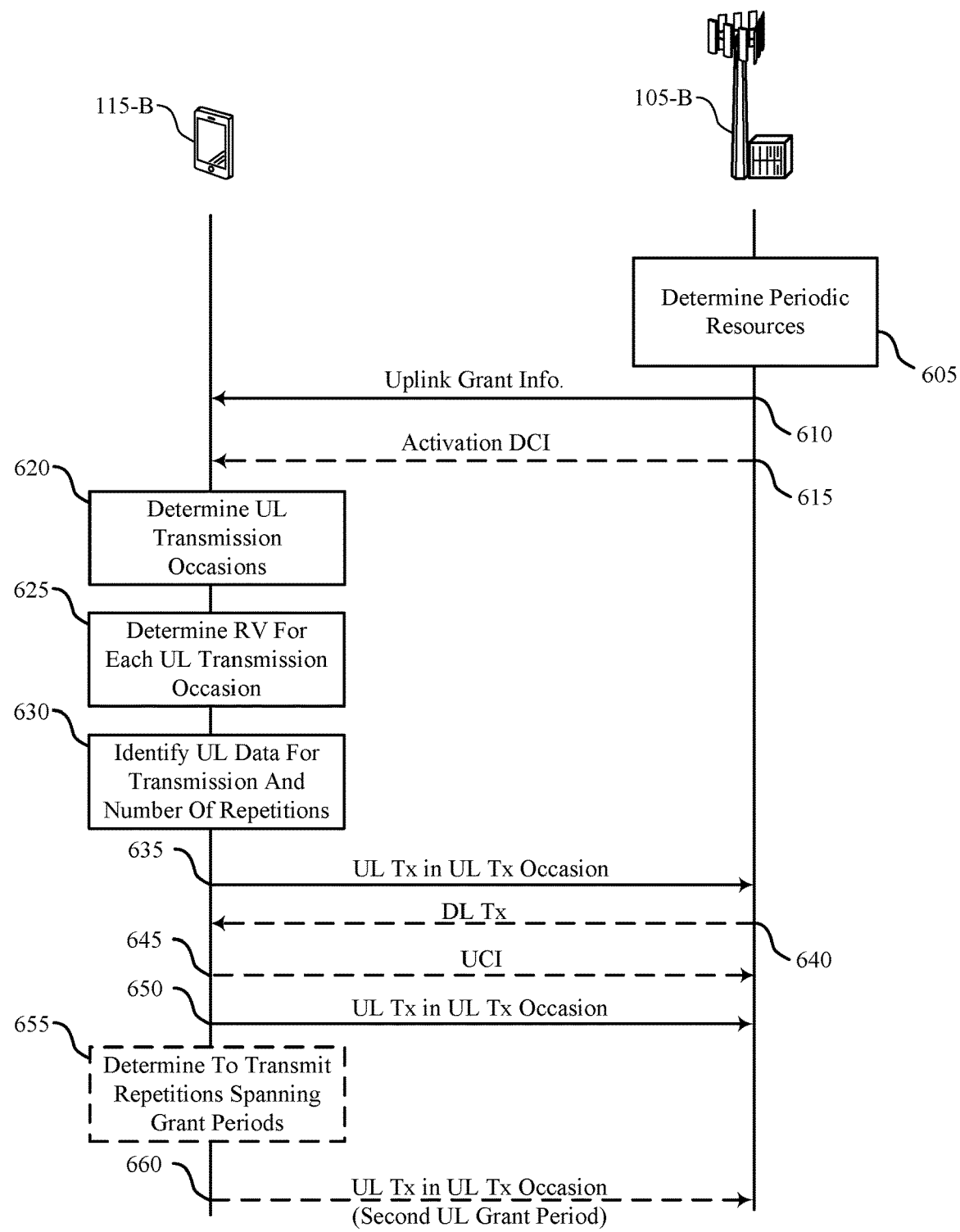
FIG. 6 illustrates an example of a process flow that supports uplink configured grant transmission repetition techniques in wireless communications in accordance with aspects of the present disclosure.

FIG. 6 illustrates an example of a process flow 600 that supports uplink configured grant transmission repetition techniques in wireless communications in accordance with aspects of the present disclosure. In some examples, process flow 600 may implement aspects of wireless communications system 100 or 200. Process flow 600 may be implemented by a UE 115-*b* and a base station 105-*b* as described herein. In the following description of the process flow 600, the communications between the UE 115-*b* and the base station 105-*b* may be transmitted in a different order than the example order shown, or the operations performed by the UE 115-*b* and base station 105-*b* may be performed in different orders or at different times. Some operations may also be omitted from the process flow 600, and other operations may be added to the process flow 600.

In some examples, the operations illustrated in process flow 600 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 605, the base station 105-*b* may determine periodic resources for one or more periodic uplink grant configurations at the UE 115-*b* (and optionally one or more other UEs). In some cases, the configured resources may be determined based on a type of communications and a periodicity of the communications (e.g., based on a request from the UE 115-*b* for periodic resources to report periodic sensor data or other periodic uplink data).

At 610, the base station 105-*b* may transmit uplink grant information to the UE 115-*b*. In some cases, the base station 105 may transmit RRC signaling including an indication of a one or more sets of parameters associated with a periodic uplink communication configuration (e.g., an SPS configuration or a configured uplink grant configuration). In other cases, the base station 105-*b* may transmit multiple periodic uplink grant configurations that each have an associated index value, and the index values may be in an ordered list for selection of uplink grant resources/parameters. In some cases, at 615, the base station 105-*b* may transmit an activation DCI to the UE 115-*b* to activate a periodic uplink grant configuration and begin using configured resources for communications.

At 620, the UE 115-*b* may determine uplink transmission occasions for an uplink period of the periodic uplink grant configuration. In some cases, the uplink transmission occasions may include one or more slots that have deferred uplink transmission occasions due to a conflict associated with the one or more slots (e.g., due to a slot being configured as a downlink slot or containing one or more downlink symbols that conflict with uplink symbols of the periodic uplink grant configuration).

At 625, the UE 115-*b* may determine a RV for each uplink transmission occasion. The RV value for each uplink transmission occasion may be determined based on a RV sequence that is provided by the periodic uplink grant configuration (e.g., based on an index value that indicates a particular RV sequence for a configured number of repetitions of an uplink communication). In some cases, the RV sequence may be applied consecutively to each uplink transmission occasion, and may skip one or more slots where uplink transmission occasions are deferred.

At 620, the UE 115-*b* may identify uplink data for transmission and a number of repetitions that are to be transmitted. In some cases, the uplink data may be provided by a higher layer at the UE 115-*b* (e.g., an application layer or PDU layer). In some cases, the number of repetitions may be configured by the periodic uplink grant configuration (e.g., according to a parameter repK that is provided with the configuration information for the periodic uplink grant). In some cases, the number of repetitions may be selected by the base station 105-*b* based on channel conditions associated with the UE 115-*b*, based on a request from the UE 115-*b*, based on a priority associated with the periodic uplink communications, based on a quality of service target associated with the uplink communications or an application that provides the uplink data, or any combinations thereof. For example, the number of repetitions may be selected to provide for soft combining of multiple instances of the uplink communication at the base station 105-*b* such that an expected reliability meets a target reliability.

At 635, the UE 115-*b* may transmit a first instance of the uplink communication in an uplink transmission of a first uplink transmission occasion in a first slot of a first set of slots of a periodic uplink grant. In some cases, the first slot may be an initial slot within the first set of slots. In other cases, the first slot may be deferred to a slot that is after the initial slot based on a conflict with the uplink resources of the initial slot (e.g., due to a scheduled downlink transmission during the initial slot).

Optionally, at 640, the base station 105-*b* may transmit a downlink transmission to the UE 115-*b* or one or more other UEs. In some cases, the downlink transmission may use a slot that is within the resources configured for the periodic uplink grant, that triggers deferral of one or more repetitions of the uplink communication, as discussed herein. Further, at 645, the UE 115-*b* may optionally transmit UCI to the base station 105-*b*. In some cases, the UCI may be multiplexed with another uplink transmission of the UE 115-*b* (e.g., using UCI piggybacking that provides the UCI with a PUSCH transmission). In other cases, the UCI may be transmitted in a control channel transmission (e.g., a PUCCH transmission). The UCI may be transmitted according to a scheduled UCI configuration, and transmitted via shared or control channel based on whether of not an uplink transmission occasion of the associated slot is deferred or not, such as discussed with reference to the example of FIG. 5.

At 650, the UE 115-*b* may transmit a second instance of the uplink communication in an uplink transmission of a second uplink transmission occasion in a second slot of the first set of slots. In some cases, one or multiple further instances of the uplink communication may be transmitted, in accordance with the configuration of the periodic uplink grants.

Optionally, at 655, the UE 115-*b* may determine to transmit repetitions that span multiple periodic uplink grant periods. In some cases, the determination to transmit repetitions that span multiple periodic uplink grant periods may be based on a number of repetitions that are transmitted in the first set of slots. For example, if the uplink data of the uplink communication was received during the uplink grant period and fewer than a threshold number of repetitions are transmitted in the first set of slots, the UE 115-*b* may determine to transmit one or more additional instances of the uplink communication in a subsequent uplink grant period. In some cases, the additional instances of the uplink communication may be transmitted using RV values that correspond to the RV sequence that is identified for the subsequent uplink grant period. In other cases, the RV sequence of the additional instances may continue with the RV sequence of the first set of slots. In some cases, the configuration information for the periodic uplink grant may enable or disable transmission of repetitions that span multiple periods of the periodic uplink grant. In some cases, the configuration information may include one or more threshold values or parameters that may be used to determine to transmit repetitions that span multiple periods of the periodic uplink grant (e.g., based on a number of instances transmitted in a prior grant period, based on a periodicity of the periodic uplink grant, based on a priority associated with the uplink communication or periodic uplink grant, or any combinations thereof). At 660, in cases where the UE 115-*b* determines to transmit one or more instances of the uplink communication in a subsequent periodic uplink grant period, the UE 115-*b* may transmit the additional repetition of the uplink communication in an uplink transmission occasion of a second set of slots of a second uplink grant period.

Figure 7:
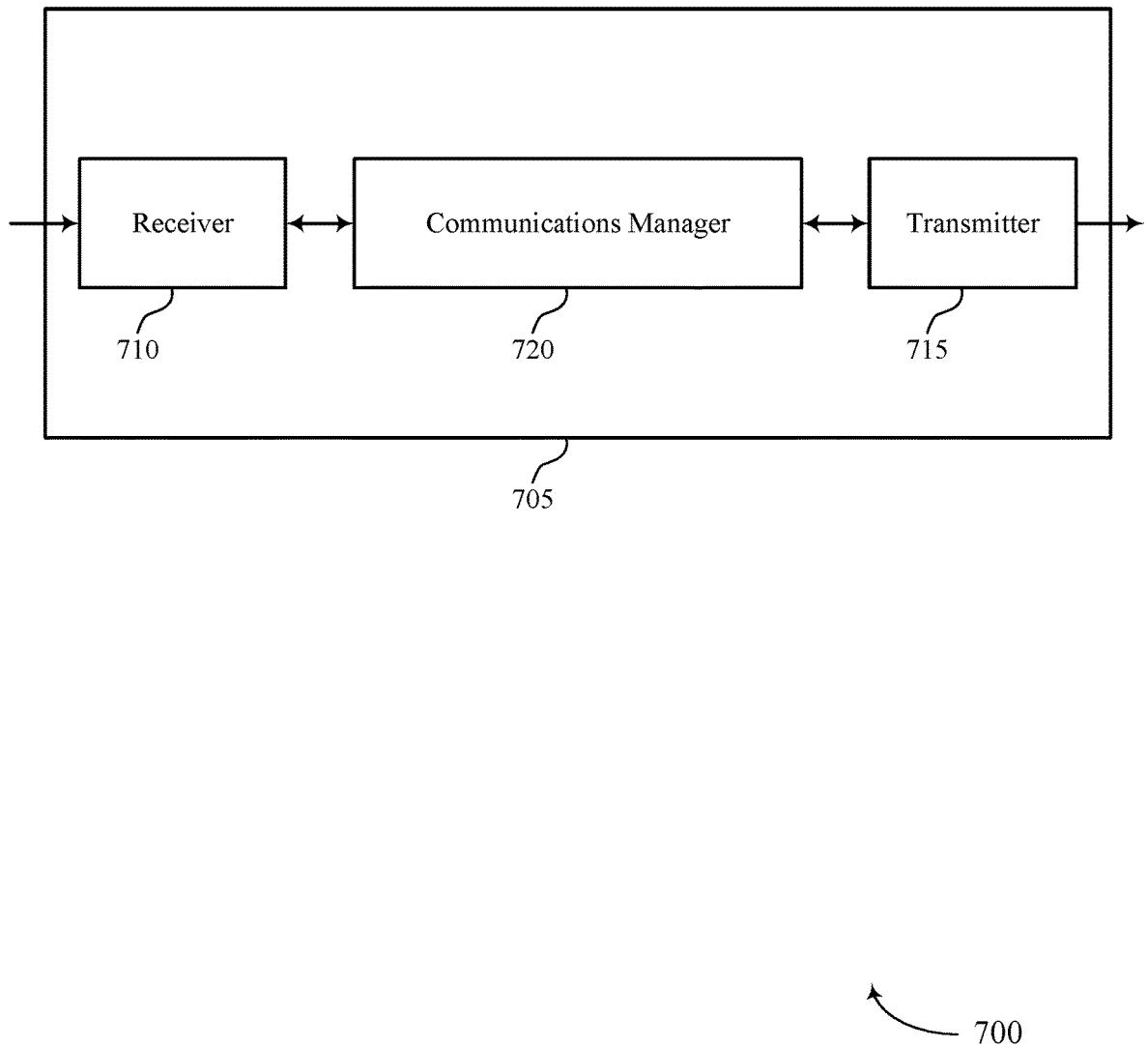
FIGS. 7 and 8 show block diagrams of devices that support uplink configured grant transmission repetition techniques in wireless communications in accordance with aspects of the present disclosure.

FIG. 7 shows a block diagram 700 of a device 705 that supports uplink configured grant transmission repetition techniques in wireless communications in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to uplink configured grant transmission repetition techniques in wireless communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to uplink configured grant transmission repetition techniques in wireless communications). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of uplink configured grant transmission repetition techniques in wireless communications as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for receiving, from a base station, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The communications manager 720 also may be configured as or otherwise support a means for determining a first set of slots for transmitting a first set of repetitions of a first uplink communication within a first uplink grant period of the set of multiple uplink grant periods, where slots of the first set of slots contain available resources to transmit repetitions of the first set of repetitions, and where an associated redundancy version value for each slot of the first set of slots is based on the sequence of redundancy version values. The communications manager 720 may be configured as or otherwise support a means for transmitting the first set of repetitions of the first uplink communication to the base station in the first uplink grant period.

Additionally or alternatively, the communications manager 720 may support wireless communication at a UE in accordance with examples as disclosed herein. For example, the communications manager 720 may be configured as or otherwise support a means for receiving, from a base station, configuration information for an uplink grant that provides periodic resources for a set of multiple uplink grant periods, where the uplink grant indicates that a set of repetitions of an uplink communication are to be transmitted by the UE to the base station. The communications manager 720 may be configured as or otherwise support a means for obtaining, during a first uplink grant period of the set of multiple uplink grant periods, data to be transmitted in a first uplink communication to the base station. The communications manager 720 may be configured as or otherwise support a means for transmitting a first subset of a first set of repetitions of the first uplink communication to the base station in the first uplink grant period. The communications manager 720 may be configured as or otherwise support a means for transmitting a second subset of the first set of repetitions of the first uplink communication to the base station in a second uplink grant period.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for enhancing reliability through repetitions of uplink communications. Such techniques may help reduce latency (e.g., through reduced need for retransmissions based on HARQ feedback), enhance reliability, reduce overhead in a wireless communications system, as well as provide for reduced processing overhead through fewer blind decoding candidates, and associated reduced power consumption.

Figure 8:
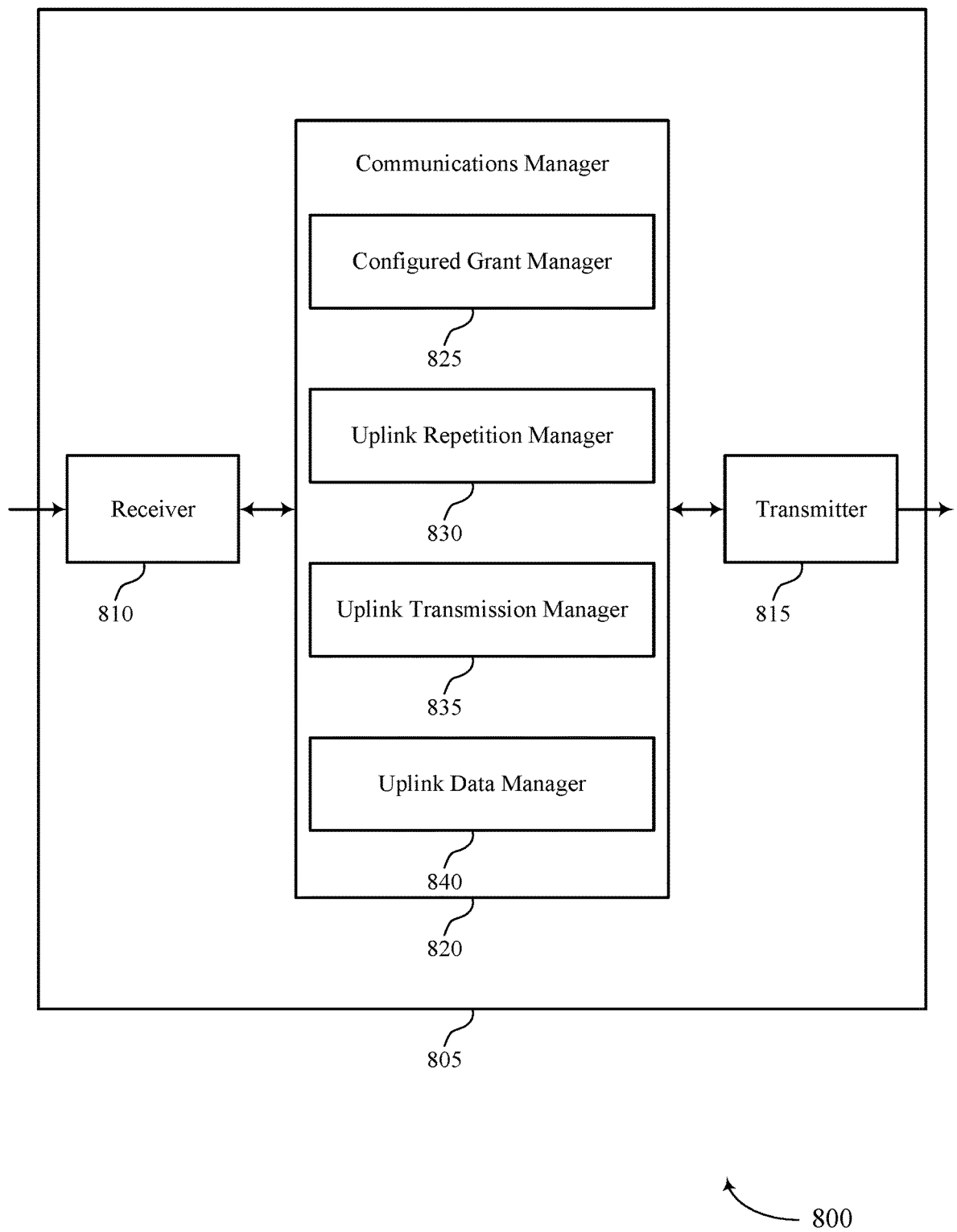

FIG. 8 shows a block diagram 800 of a device 805 that supports uplink configured grant transmission repetition techniques in wireless communications in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to uplink configured grant transmission repetition techniques in wireless communications). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to uplink configured grant transmission repetition techniques in wireless communications). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of uplink configured grant transmission repetition techniques in wireless communications as described herein. For example, the communications manager 820 may include a configured grant manager 825, an uplink repetition manager 830, an uplink transmission manager 835, an uplink data manager 840, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The configured grant manager 825 may be configured as or otherwise support a means for receiving, from a base station, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The uplink repetition manager 830 may be configured as or otherwise support a means for determining a first set of slots for transmitting a first set of repetitions of a first uplink communication within a first uplink grant period of the set of multiple uplink grant periods, where slots of the first set of slots contain available resources to transmit repetitions of the first set of repetitions, and where an associated redundancy version value for each slot of the first set of slots is based on the sequence of redundancy version values. The uplink transmission manager 835 may be configured as or otherwise support a means for transmitting the first set of repetitions of the first uplink communication to the base station in the first uplink grant period.

Additionally or alternatively, the communications manager 820 may support wireless communication at a UE in accordance with examples as disclosed herein. The configured grant manager 825 may be configured as or otherwise support a means for receiving, from a base station, configuration information for an uplink grant that provides periodic resources for a set of multiple uplink grant periods, where the uplink grant indicates that a set of repetitions of an uplink communication are to be transmitted by the UE to the base station. The uplink data manager 840 may be configured as or otherwise support a means for obtaining, during a first uplink grant period of the set of multiple uplink grant periods, data to be transmitted in a first uplink communication to the base station. The uplink transmission manager 835 may be configured as or otherwise support a means for transmitting a first subset of a first set of repetitions of the first uplink communication to the base station in the first uplink grant period. The uplink transmission manager 835 may be configured as or otherwise support a means for transmitting a second subset of the first set of repetitions of the first uplink communication to the base station in a second uplink grant period.

Figure 9:
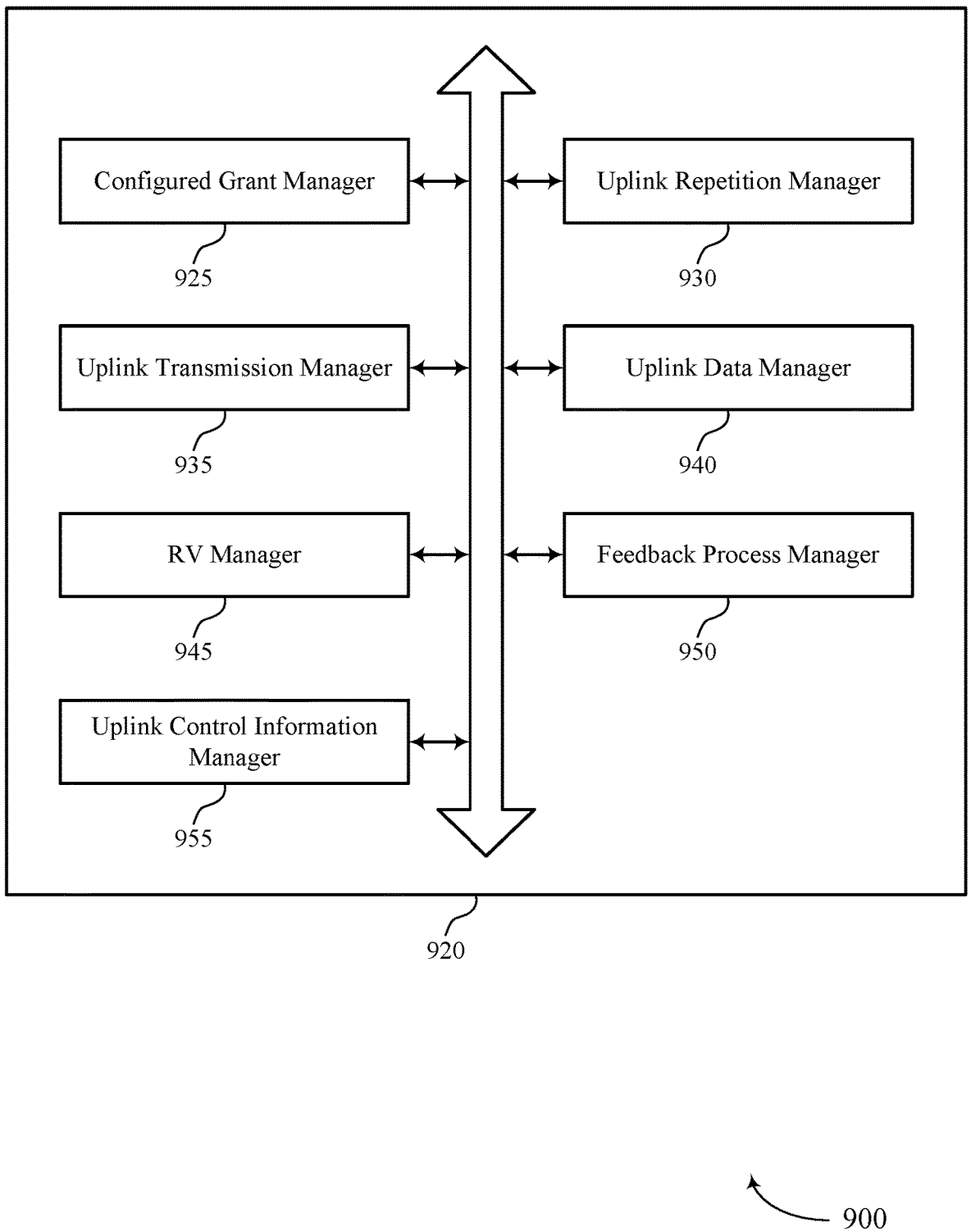
FIG. 9 shows a block diagram of a communications manager that supports uplink configured grant transmission repetition techniques in wireless communications in accordance with aspects of the present disclosure.

FIG. 9 shows a block diagram 900 of a communications manager 920 that supports uplink configured grant transmission repetition techniques in wireless communications in accordance with aspects of the present disclosure. The communications manager 920 may be an example of aspects of a communications manager 720, a communications manager 820, or both, as described herein. The communications manager 920, or various components thereof, may be an example of means for performing various aspects of uplink configured grant transmission repetition techniques in wireless communications as described herein. For example, the communications manager 920 may include a configured grant manager 925, an uplink repetition manager 930, an uplink transmission manager 935, an uplink data manager 940, an RV manager 945, a feedback process manager 950, an uplink control information manager 955, or any combination thereof. Each of these components may communicate, directly or indirectly, with one another (e.g., via one or more buses).

The communications manager 920 may support wireless communication at a UE in accordance with examples as disclosed herein. The configured grant manager 925 may be configured as or otherwise support a means for receiving, from a base station, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The uplink repetition manager 930 may be configured as or otherwise support a means for determining a first set of slots for transmitting a first set of repetitions of a first uplink communication within a first uplink grant period of the set of multiple uplink grant periods, where slots of the first set of slots contain available resources to transmit repetitions of the first set of repetitions, and where an associated redundancy version value for each slot of the first set of slots is based on the sequence of redundancy version values. The uplink transmission manager 935 may be configured as or otherwise support a means for transmitting the first set of repetitions of the first uplink communication to the base station in the first uplink grant period. In some examples, the first set of slots for the first set of repetitions are non-contiguous slots within the first uplink grant period.

In some examples, the uplink data manager 940 may be configured as or otherwise support a means for identifying, during the first uplink grant period, data to be transmitted in the first uplink communication. In some examples, the uplink repetition manager 930 may be configured as or otherwise support a means for determining an initial slot for an initial repetition of the first set of repetitions that is subsequent to a starting slot of the first set of slots, where the initial slot is based on one or more available transmission starting locations within the sequence of redundancy version values, and where a number of repetitions of the first uplink communication is based on an indication in the grant, a number of available starting locations, a location of the initial slot within the first set of slots, or any combinations thereof.

In some examples, the uplink repetition manager 930 may be configured as or otherwise support a means for receiving, from the base station, an indication to enable repetition deferral to transmit one or more of the repetitions and where an initial slot for the first uplink communication is an earliest slot of the first set of slots.

In some examples, an initial slot of the first set of slots is subsequent to an earliest slot of the first uplink grant period, and where the sequence of redundancy version values starts at the earliest slot of the first uplink grant period and the initial slot uses a redundancy version value from the sequence of redundancy version values that corresponds to a location of the initial slot relative to the earliest slot of the first uplink grant period. In some examples, an initial slot of the first set of slots is subsequent to an earliest slot of the first uplink grant period, and where the sequence of redundancy version values starts at the initial slot of the first set of slots.

In some examples, a feedback process identification for the first uplink communication is based on a first symbol of a first slot of the first uplink grant period irrespective of whether the first slot of the first uplink grant period includes a repetition of the first uplink communication. In some examples, a feedback process identification for the first uplink communication is based on a first symbol of an earliest slot of the first uplink grant period that includes a repetition of the first uplink communication.

In some examples, the uplink transmission manager 935 may be configured as or otherwise support a means for transmitting a second set of repetitions of the first uplink communication to the base station in a second uplink grant period that is subsequent to the first uplink grant period. In some examples, the second set of repetitions are transmitted based on a threshold value associated with the first uplink grant period, and where the threshold value corresponds to a number of repetitions available in the first uplink grant period, a periodicity of uplink grant periods, a number of available slots for uplink grant repetitions within the one or more uplink grant periods, or any combinations thereof.

In some examples, the uplink control information manager 955 may be configured as or otherwise support a means for transmitting an uplink control information communication to the base station in a predetermined slot that is configured for uplink control information, irrespective of whether the predetermined slot is in the first set of slots. In some examples, the uplink control information is multiplexed with a repetition of the first set of repetitions when the predetermined slot is in the first set of slots and the uplink control information is not multiplexed with a repetition of the first set of repetitions when the predetermined slot is not in the first set of slots.

Additionally or alternatively, the communications manager 920 may support wireless communication at a UE in accordance with examples as disclosed herein. In some examples, the configured grant manager 925 may be configured as or otherwise support a means for receiving, from a base station, configuration information for an uplink grant that provides periodic resources for a set of multiple uplink grant periods, where the uplink grant indicates that a set of repetitions of an uplink communication are to be transmitted by the UE to the base station. The uplink data manager 940 may be configured as or otherwise support a means for obtaining, during a first uplink grant period of the set of multiple uplink grant periods, data to be transmitted in a first uplink communication to the base station. In some examples, the uplink transmission manager 935 may be configured as or otherwise support a means for transmitting a first subset of a first set of repetitions of the first uplink communication to the base station in the first uplink grant period. In some examples, the uplink transmission manager 935 may be configured as or otherwise support a means for transmitting a second subset of the first set of repetitions of the first uplink communication to the base station in a second uplink grant period.

In some examples, the second subset of the first set of repetitions are transmitted based on a threshold value associated with the first uplink grant period. In some examples, the threshold value corresponds to a number of repetitions available in the first uplink grant period, a periodicity of uplink grant periods, a number of available slots for uplink grant repetitions within the one or more uplink grant periods, or any combinations thereof.

In some examples, the uplink repetition manager 930 may be configured as or otherwise support a means for receiving, from the base station, an indication to enable repetition deferral to transmit one or more repetitions in non-contiguous slots. In some examples, a first set of slots for the first set of repetitions are non-contiguous slots within the first uplink grant period, and an associated redundancy version value of each slot of the first set of slots is based on a sequence of redundancy version values associated with the first set of repetitions.

In some examples, an initial slot of the first set of slots for the first set of repetitions is subsequent to an earliest slot of the first uplink grant period, and where the sequence of redundancy version is determined based on the earliest slot of the first uplink grant period or the initial slot of the first set of slots. In some examples, a feedback process identification for the first uplink communication is based on a first symbol of an earliest slot of the first uplink grant period that includes a repetition of the first uplink communication.

In some examples, the uplink control information manager 955 may be configured as or otherwise support a means for transmitting an uplink control information communication to the base station in a predetermined slot of the first uplink grant period that is configured for uplink control information, where the uplink control information is transmitted in a control channel or is multiplexed with a repetition of the first uplink communication based on whether the predetermined slot includes a repetition of the first uplink communication.

Figure 10:
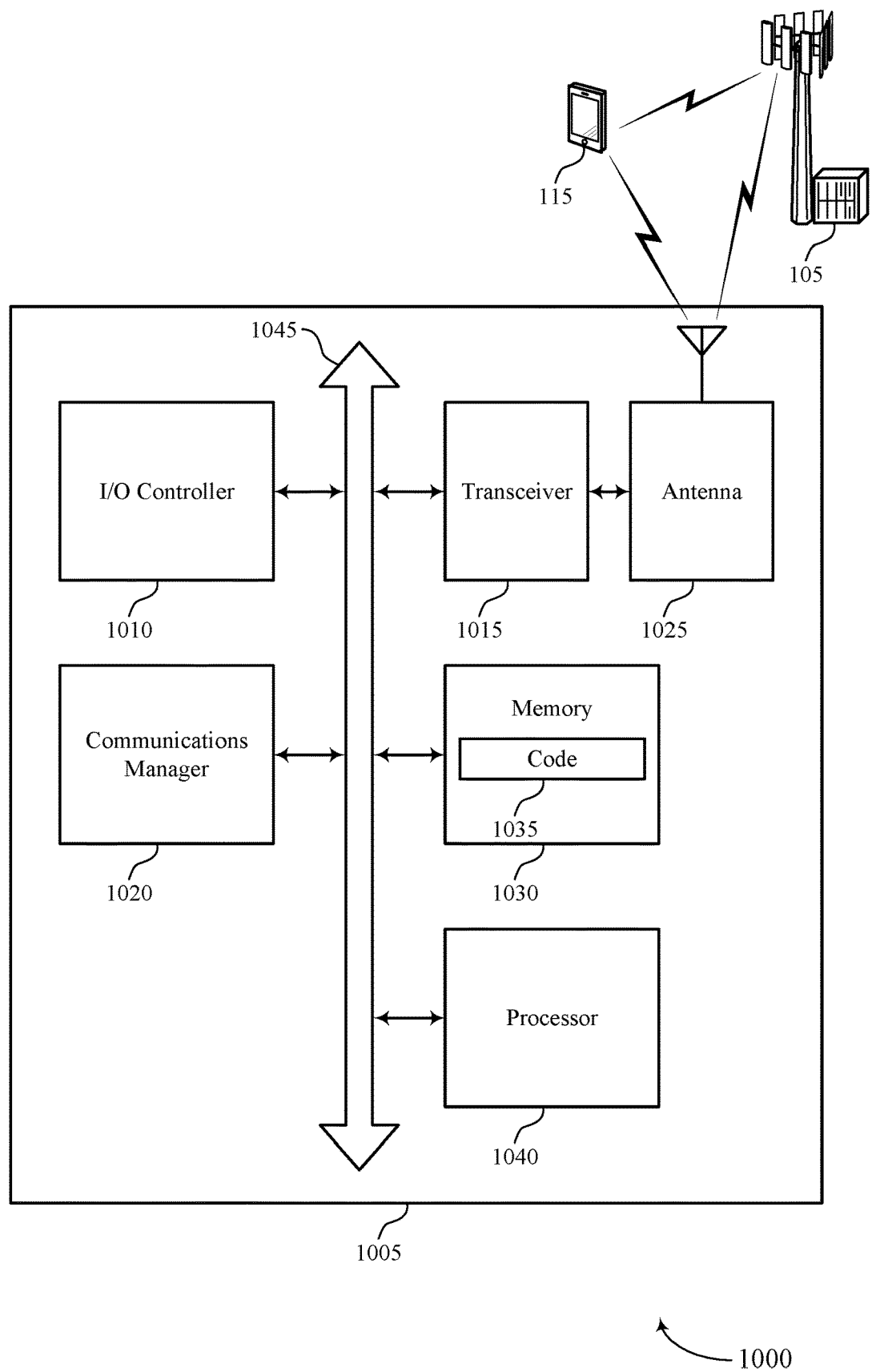
FIG. 10 shows a diagram of a system including a device that supports uplink configured grant transmission repetition techniques in wireless communications in accordance with aspects of the present disclosure.

FIG. 10 shows a diagram of a system 1000 including a device 1005 that supports uplink configured grant transmission repetition techniques in wireless communications in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting uplink configured grant transmission repetition techniques in wireless communications). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving, from a base station, configuration information for an uplink grant that provides periodic resources for a set of multiple uplink grant periods, where the configuration information indicates that a set of repetitions of an uplink communication are to be transmitted in a set of slots within one or more uplink grant periods, and repetitions of the set of repetitions have associated redundancy version values of a sequence of redundancy version values. The communications manager 1020 may be configured as or otherwise support a means for determining a first set of slots for transmitting a first set of repetitions of a first uplink communication within a first uplink grant period of the set of multiple uplink grant periods, where slots of the first set of slots contain available resources to transmit repetitions of the first set of repetitions, and where an associated redundancy version value for each slot of the first set of slots is based on the sequence of redundancy version values. The communications manager 1020 may be configured as or otherwise support a means for transmitting the first set of repetitions of the first uplink communication to the base station in the first uplink grant period.

Additionally or alternatively, the communications manager 1020 may support wireless communication at a UE in accordance with examples as disclosed herein. For example, the communications manager 1020 may be configured as or otherwise support a means for receiving, from a base station, configuration information for an uplink grant that provides periodic resources for a set of multiple uplink grant periods, where the uplink grant indicates that a set of repetitions of an uplink communication are to be transmitted by the UE to the base station. The communications manager 1020 may be configured as or otherwise support a means for obtaining, during a first uplink grant period of the set of multiple uplink grant periods, data to be transmitted in a first uplink communication to the base station. The communications manager 1020 may be configured as or otherwise support a means for transmitting a first subset of a first set of repetitions of the first uplink communication to the base station in the first uplink grant period. The communications manager 1020 may be configured as or otherwise support a means for transmitting a second subset of the first set of repetitions of the first uplink communication to the base station in a second uplink grant period.

By including or configuring the communications manager 1020 in accordance with examples as described herein, the device 1005 may support techniques for enhancing reliability through repetitions of uplink communications. Such techniques may help reduce latency (e.g., through reduced need for retransmissions based on HARQ feedback), enhance reliability, reduce overhead in a wireless communications system, as well as provide for reduced processing overhead through fewer blind decoding candidates, and associated reduced power consumption, longer battery life, and improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of uplink configured grant transmission repetition techniques in wireless communications as described herein, or the processor 1040 and the memory 1030 may be otherwise configured to perform or support such operations.

Figure 11:
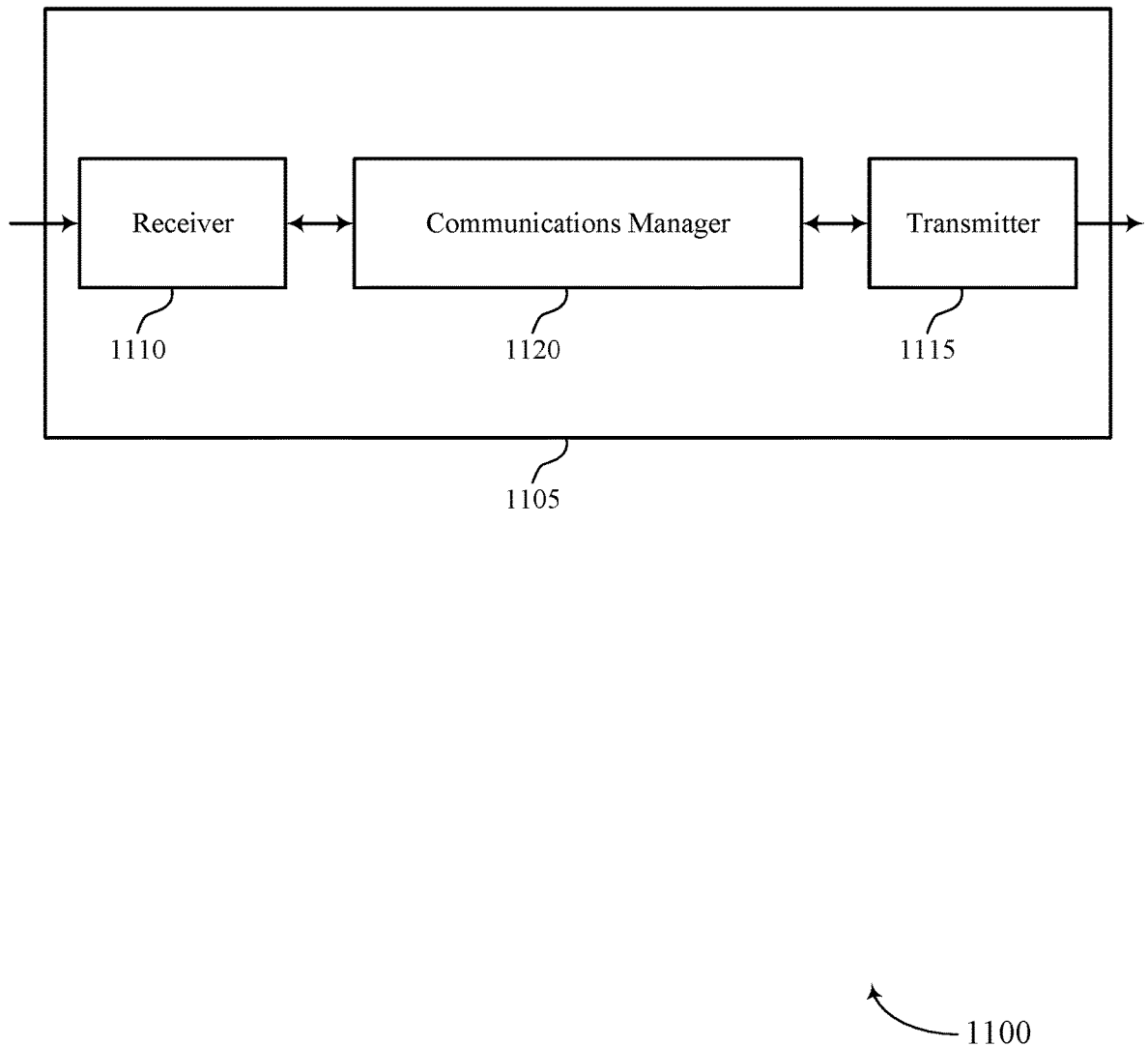
FIGS. 11 and 12 show block diagrams of devices that support uplink configured grant transmission repetition techniques in wireless communications in accordance with aspects of the present disclosure.

FIG. 11 shows a block diagram 1100 of a device 1105 that supports uplink configured grant transmission repetition techniques in wireless communications in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to uplink configured grant transmission repetition techniques in wireless communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to uplink configured grant transmission repetition techniques in wireless communications). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of uplink configured grant transmission repetition techniques in wireless communications as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to a UE, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The communications manager 1120 may be configured as or otherwise support a means for receiving a first set of repetitions of a first uplink communication from the UE in a first uplink grant period of the set of multiple uplink grant periods, where a first set of slots for the first set of repetitions are within the first uplink grant period, and the associated redundancy version value of each slot of the first set of slots is based on the sequence of redundancy version values.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for enhancing reliability through repetitions of uplink communications. Such techniques may help reduce latency (e.g., through reduced need for retransmissions based on HARQ feedback), enhance reliability, reduce overhead in a wireless communications system, as well as provide for reduced processing overhead through fewer blind decoding candidates, and associated reduced power consumption.

Figure 12:
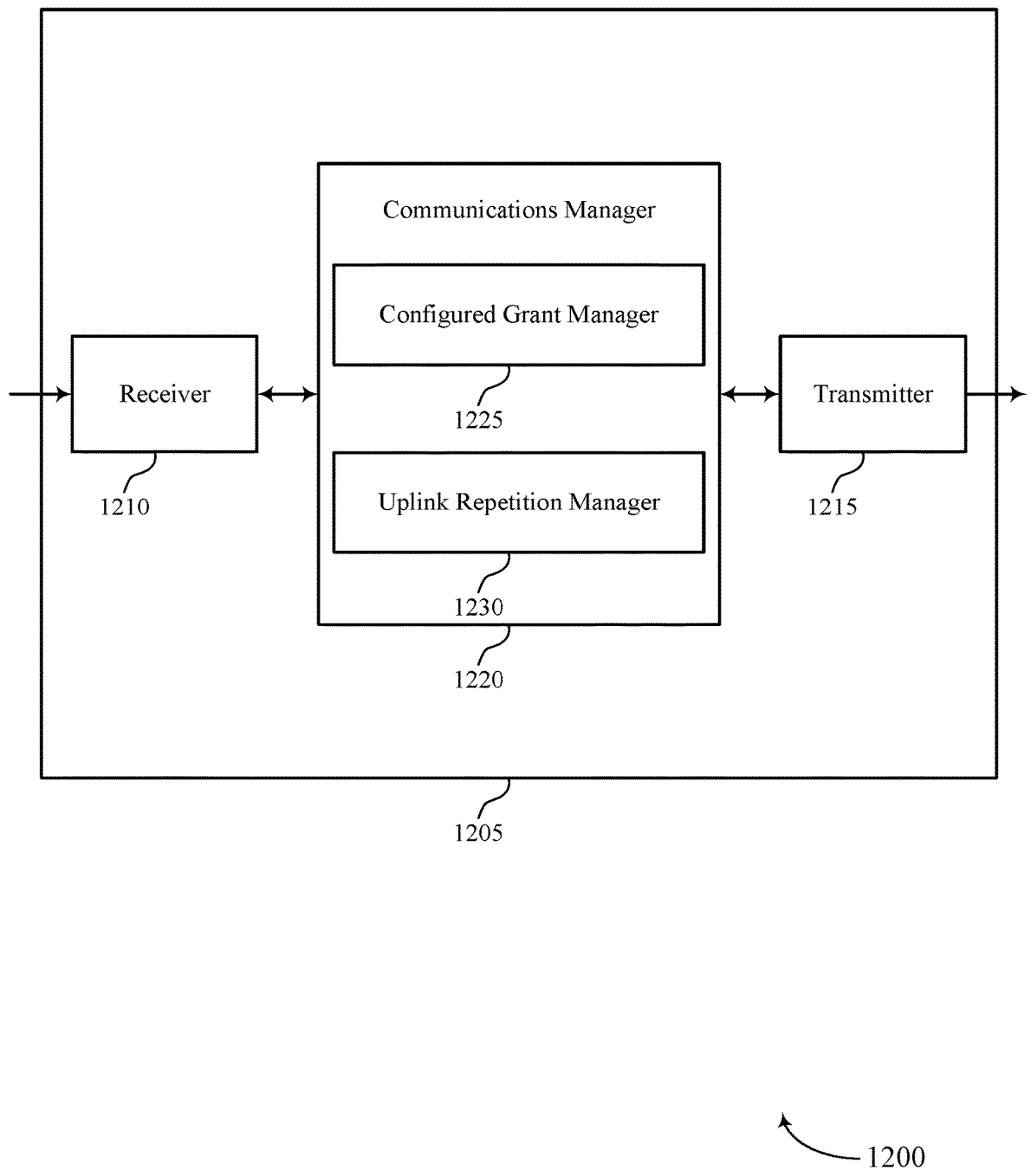

FIG. 12 shows a block diagram 1200 of a device 1205 that supports uplink configured grant transmission repetition techniques in wireless communications in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to uplink configured grant transmission repetition techniques in wireless communications). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to uplink configured grant transmission repetition techniques in wireless communications). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of uplink configured grant transmission repetition techniques in wireless communications as described herein. For example, the communications manager 1220 may include a configured grant manager 1225 an uplink repetition manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The configured grant manager 1225 may be configured as or otherwise support a means for transmitting, to a UE, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The uplink repetition manager 1230 may be configured as or otherwise support a means for receiving a first set of repetitions of a first uplink communication from the UE in a first uplink grant period of the set of multiple uplink grant periods, where a first set of slots for the first set of repetitions are within the first uplink grant period, and the associated redundancy version value of each slot of the first set of slots is based on the sequence of redundancy version values.

Figure 13:
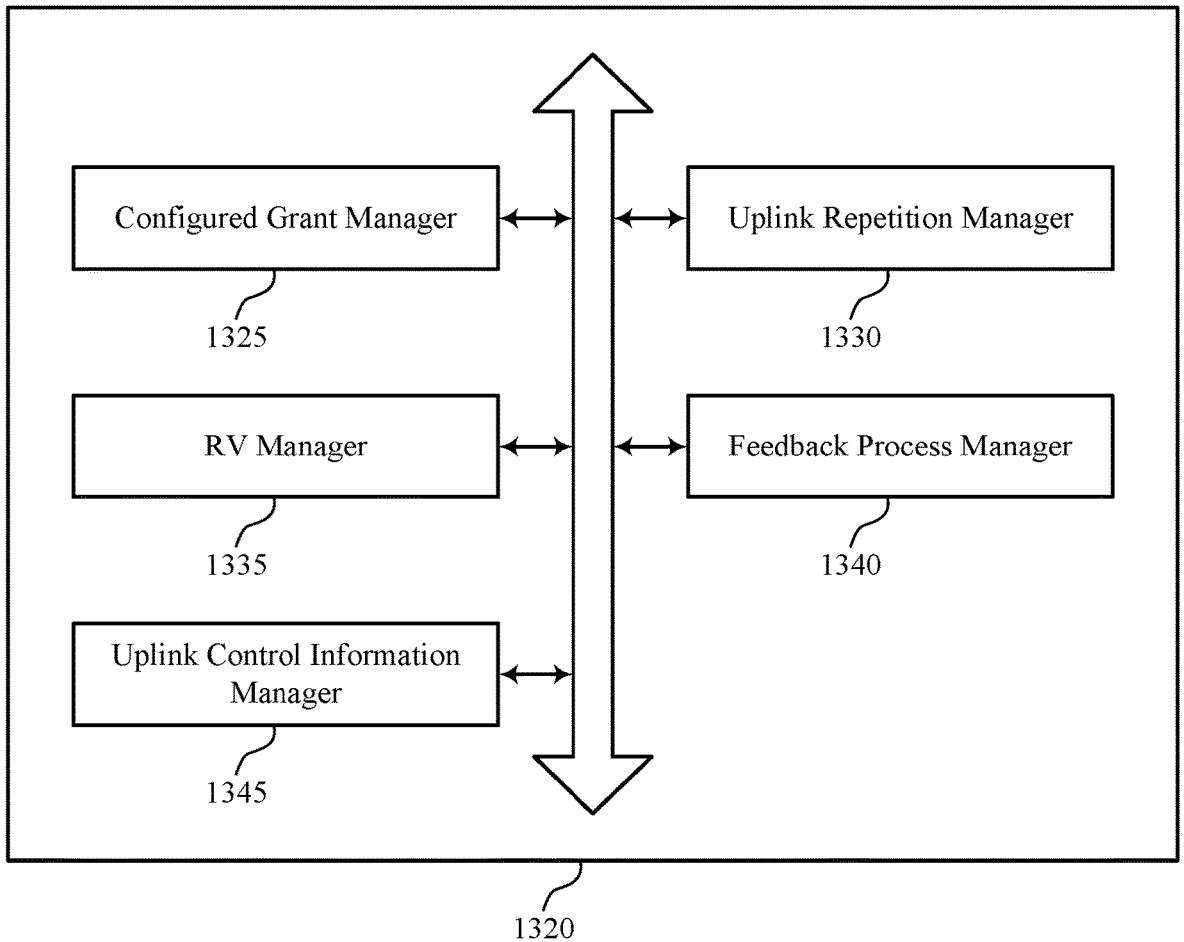
FIG. 13 shows a block diagram of a communications manager that supports uplink configured grant transmission repetition techniques in wireless communications in accordance with aspects of the present disclosure.

FIG. 13 shows a block diagram 1300 of a communications manager 1320 that supports uplink configured grant transmission repetition techniques in wireless communications in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of uplink configured grant transmission repetition techniques in wireless communications as described herein. For example, the communications manager 1320 may include a configured grant manager 1325, an uplink repetition manager 1330, an RV manager 1335, a feedback process manager 1340, an uplink control information manager 1345, or any combination thereof. Each of these components may communicate, directly or indirectly, with one another (e.g., via one or more buses).

The communications manager 1320 may support wireless communication at a base station in accordance with examples as disclosed herein. The configured grant manager 1325 may be configured as or otherwise support a means for transmitting, to a UE, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The uplink repetition manager 1330 may be configured as or otherwise support a means for receiving a first set of repetitions of a first uplink communication from the UE in a first uplink grant period of the set of multiple uplink grant periods, where a first set of slots for the first set of repetitions are within the first uplink grant period, and the associated redundancy version value of each slot of the first set of slots is based on the sequence of redundancy version values.

In some examples, the uplink repetition manager 1330 may be configured as or otherwise support a means for transmitting, to the UE, an indication to enable repetition deferral for transmission of one or more of the repetitions in non-contiguous slots. In some examples, an initial slot of the first set of slots for the first set of repetitions is subsequent to an earliest slot of the first uplink grant period, and where the sequence of redundancy version is determined based on the earliest slot of the first uplink grant period or the initial slot of the first set of slots. In some examples, a feedback process identification for the first uplink communication is based on a first symbol of an earliest slot of the first uplink grant period that includes a repetition of the first uplink communication.

In some examples, the uplink repetition manager 1330 may be configured as or otherwise support a means for receiving a second set of repetitions of the first uplink communication from the UE in a second uplink grant period that is subsequent to the first uplink grant period based on a threshold value associated with the first uplink grant period. In some examples, the uplink repetition manager 1330 may be configured as or otherwise support a means for where the threshold value corresponds to a number of repetitions available in the first uplink grant period, a periodicity of uplink grant periods, a number of available slots for uplink grant repetitions within the one or more uplink grant periods, or any combinations thereof.

In some examples, the uplink control information manager 1345 may be configured as or otherwise support a means for receiving an uplink control information communication from the UE in a predetermined slot of the first uplink grant period that is configured for uplink control information, where the uplink control information is transmitted in a control channel or is multiplexed with a repetition of the first uplink communication based on whether the predetermined slot includes a repetition of the first uplink communication.

Figure 14:
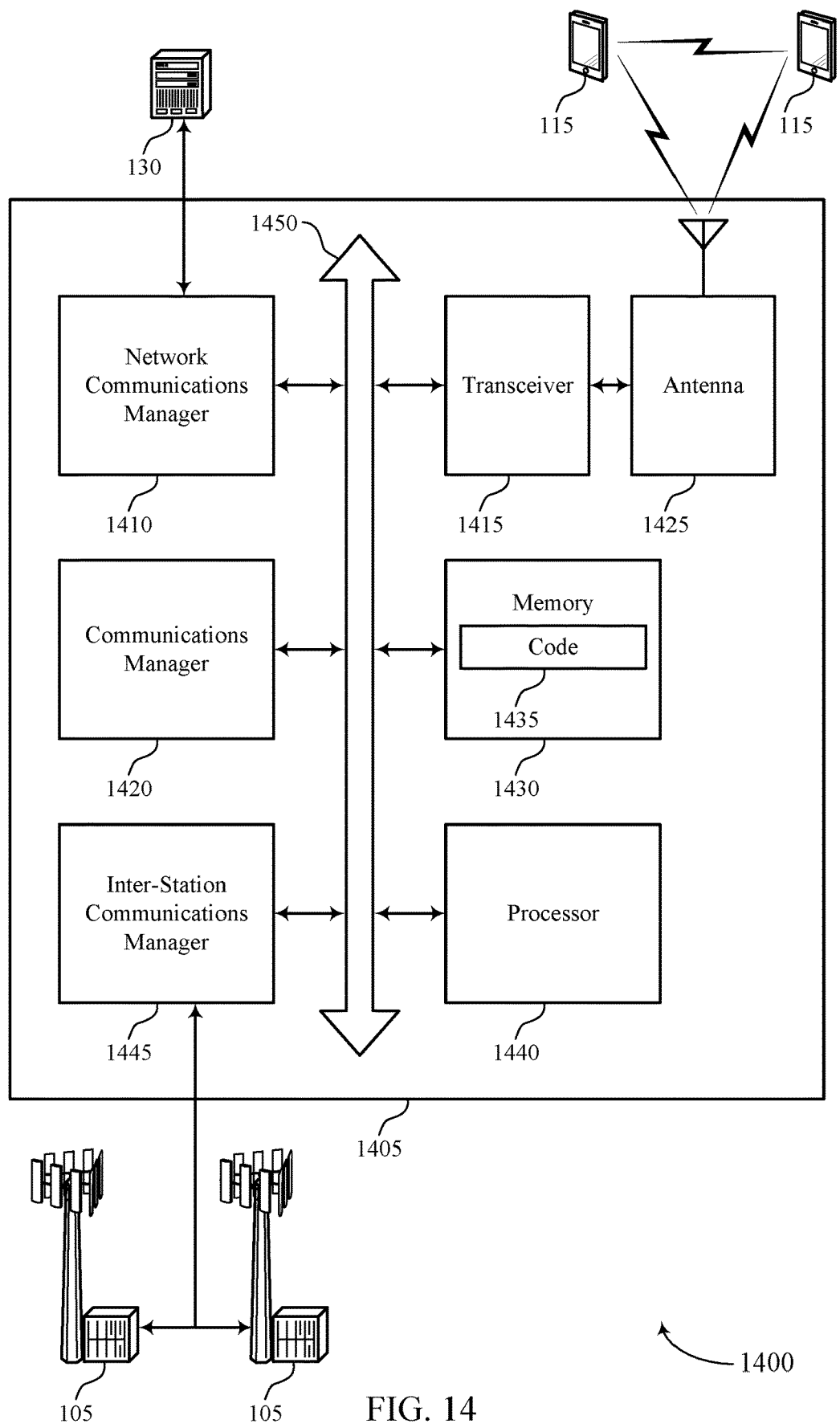
FIG. 14 shows a diagram of a system including a device that supports uplink configured grant transmission repetition techniques in wireless communications in accordance with aspects of the present disclosure.

FIG. 14 shows a diagram of a system 1400 including a device 1405 that supports uplink configured grant transmission repetition techniques in wireless communications in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting uplink configured grant transmission repetition techniques in wireless communications). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to a UE, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The communications manager 1420 may be configured as or otherwise support a means for receiving a first set of repetitions of a first uplink communication from the UE in a first uplink grant period of the set of multiple uplink grant periods, where a first set of slots for the first set of repetitions are within the first uplink grant period, and the associated redundancy version value of each slot of the first set of slots is based on the sequence of redundancy version values.

By including or configuring the communications manager 1420 in accordance with examples as described herein, the device 1405 may support techniques for enhancing reliability through repetitions of uplink communications. Such techniques may help reduce latency (e.g., through reduced need for retransmissions based on HARQ feedback), enhance reliability, reduce overhead in a wireless communications system, as well as provide for reduced processing overhead through fewer blind decoding candidates, and associated reduced power consumption.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of uplink configured grant transmission repetition techniques in wireless communications as described herein, or the processor 1440 and the memory 1430 may be otherwise configured to perform or support such operations.

Figure 15:
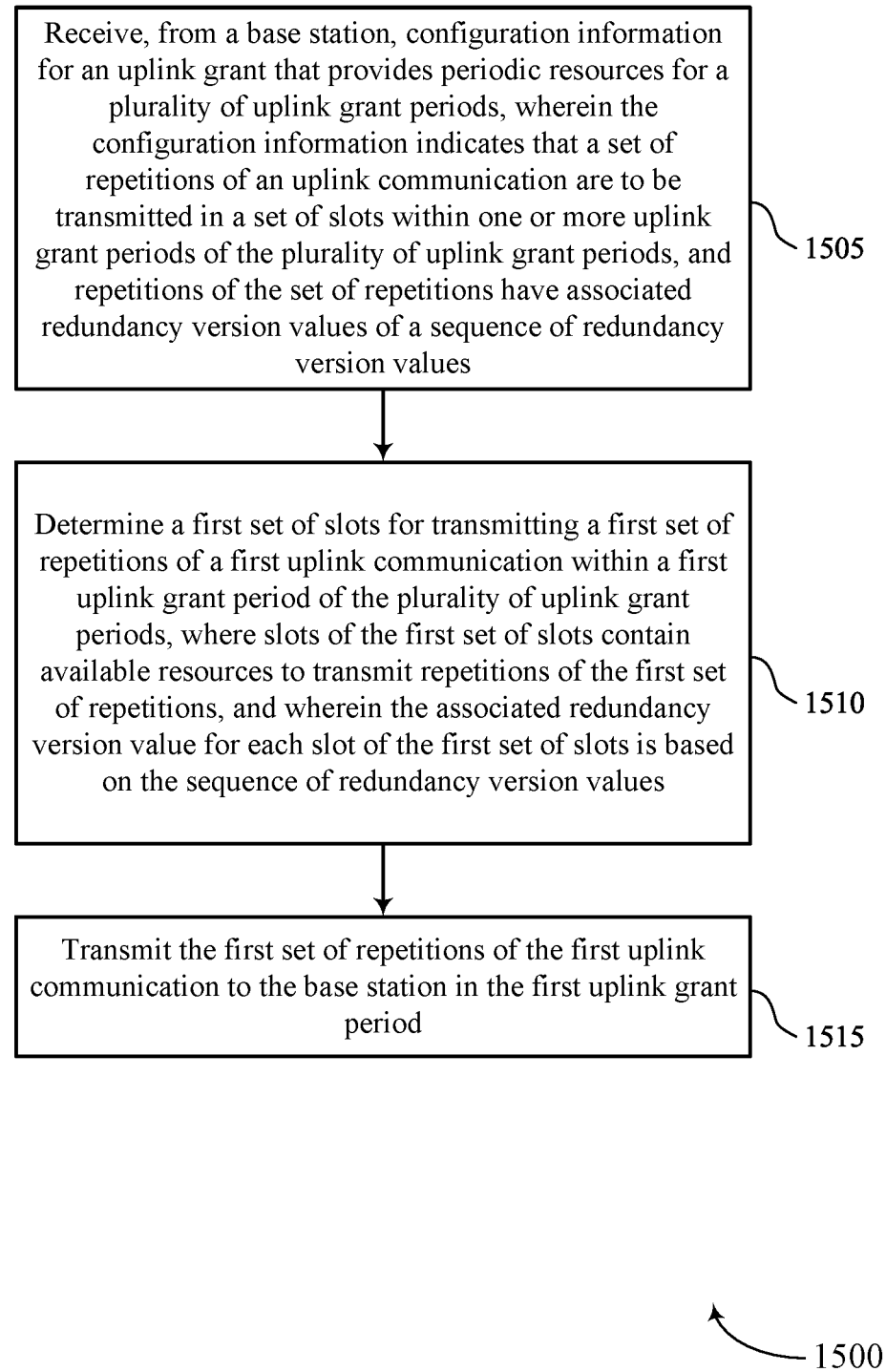
FIGS. 15 through 23 show flowcharts illustrating methods that support uplink configured grant transmission repetition techniques in wireless communications in accordance with aspects of the present disclosure.

FIG. 15 shows a flowchart illustrating a method 1500 that supports uplink configured grant transmission repetition techniques in wireless communications in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The operations of 1505 may be performed in accordance with examples as disclosed herein. In some examples, aspects of the operations of 1505 may be performed by a configured grant manager 925 as described with reference to FIG. 9.

At 1510, the method may include determining a first set of slots for transmitting a first set of repetitions of a first uplink communication within a first uplink grant period of the set of multiple uplink grant periods, where slots of the first set of slots contain available resources to transmit repetitions of the first set of repetitions, and where an associated redundancy version value for each slot of the first set of slots is based on the sequence of redundancy version values. The operations of 1510 may be performed in accordance with examples as disclosed herein. In some examples, aspects of the operations of 1510 may be performed by an uplink repetition manager 930 as described with reference to FIG. 9.

At 1515, the method may include transmitting the first set of repetitions of the first uplink communication to the base station in the first uplink grant period. The operations of 1515 may be performed in accordance with examples as disclosed herein. In some examples, aspects of the operations of 1515 may be performed by an uplink transmission manager 935 as described with reference to FIG. 9.

Figure 16:
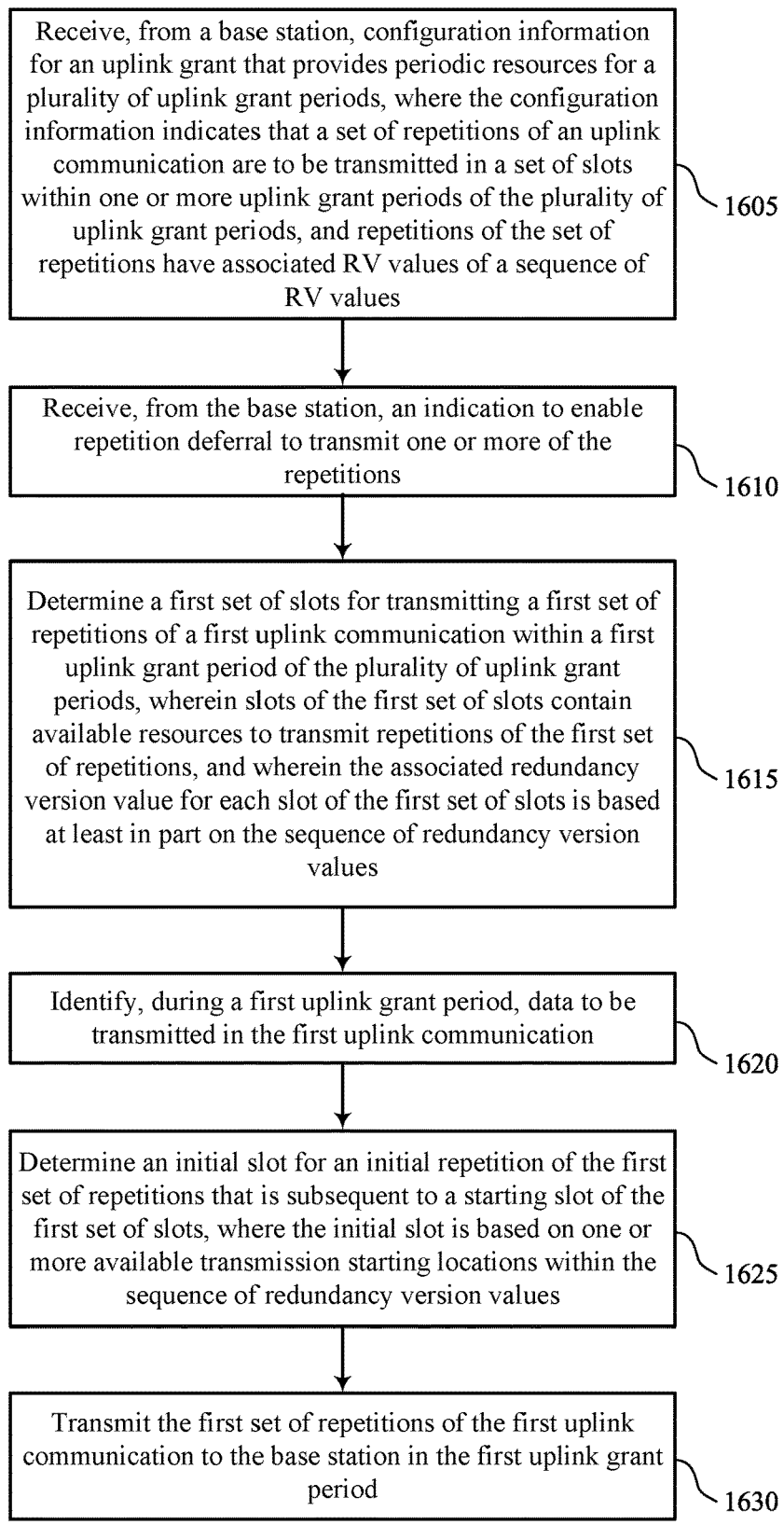

FIG. 16 shows a flowchart illustrating a method 1600 that supports uplink configured grant transmission repetition techniques in wireless communications in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The operations of 1605 may be performed in accordance with examples as disclosed herein. In some examples, aspects of the operations of 1605 may be performed by a configured grant manager 925 as described with reference to FIG. 9.

At 1610, the method may include receiving, from the base station, an indication to enable repetition deferral to transmit one or more of the repetitions. The operations of 1610 may be performed in accordance with examples as disclosed herein. In some examples, aspects of the operations of 1610 may be performed by an uplink repetition manager 930 as described with reference to FIG. 9. In some cases, an initial slot for the first uplink communication is an earliest slot of the first set of slots.

At 1615, the method may include determining a first set of slots for transmitting a first set of repetitions of a first uplink communication within a first uplink grant period of the set of multiple uplink grant periods, where slots of the first set of slots contain available resources to transmit repetitions of the first set of repetitions, and where an associated redundancy version value for each slot of the first set of slots is based on the sequence of redundancy version values. The operations of 1615 may be performed in accordance with examples as disclosed herein. In some examples, aspects of the operations of 1615 may be performed by an uplink repetition manager 930 as described with reference to FIG. 9.

At 1620, the method may include identifying, during a first uplink grant period, data to be transmitted in the first uplink communication. The operations of 1620 may be performed in accordance with examples as disclosed herein. In some examples, aspects of the operations of 1620 may be performed by an uplink data manager 940 as described with reference to FIG. 9.

At 1625, the method may include determining an initial slot for an initial repetition of the first set of repetitions that is subsequent to a starting slot of the first set of slots, where the initial slot is based on one or more available transmission starting locations within the sequence of redundancy version values. The operations of 1625 may be performed in accordance with examples as disclosed herein. In some examples, aspects of the operations of 1625 may be performed by an uplink repetition manager 930 as described with reference to FIG. 9. In some cases, a number of repetitions of the first uplink communication is based on an indication in the grant, a number of available starting locations, a location of the initial slot within the first set of slots, or any combinations thereof.

At 1630, the method may include transmitting the first set of repetitions of the first uplink communication to the base station in the first uplink grant period. The operations of 1630 may be performed in accordance with examples as disclosed herein. In some examples, aspects of the operations of 1630 may be performed by an uplink transmission manager 935 as described with reference to FIG. 9.

Figure 17:
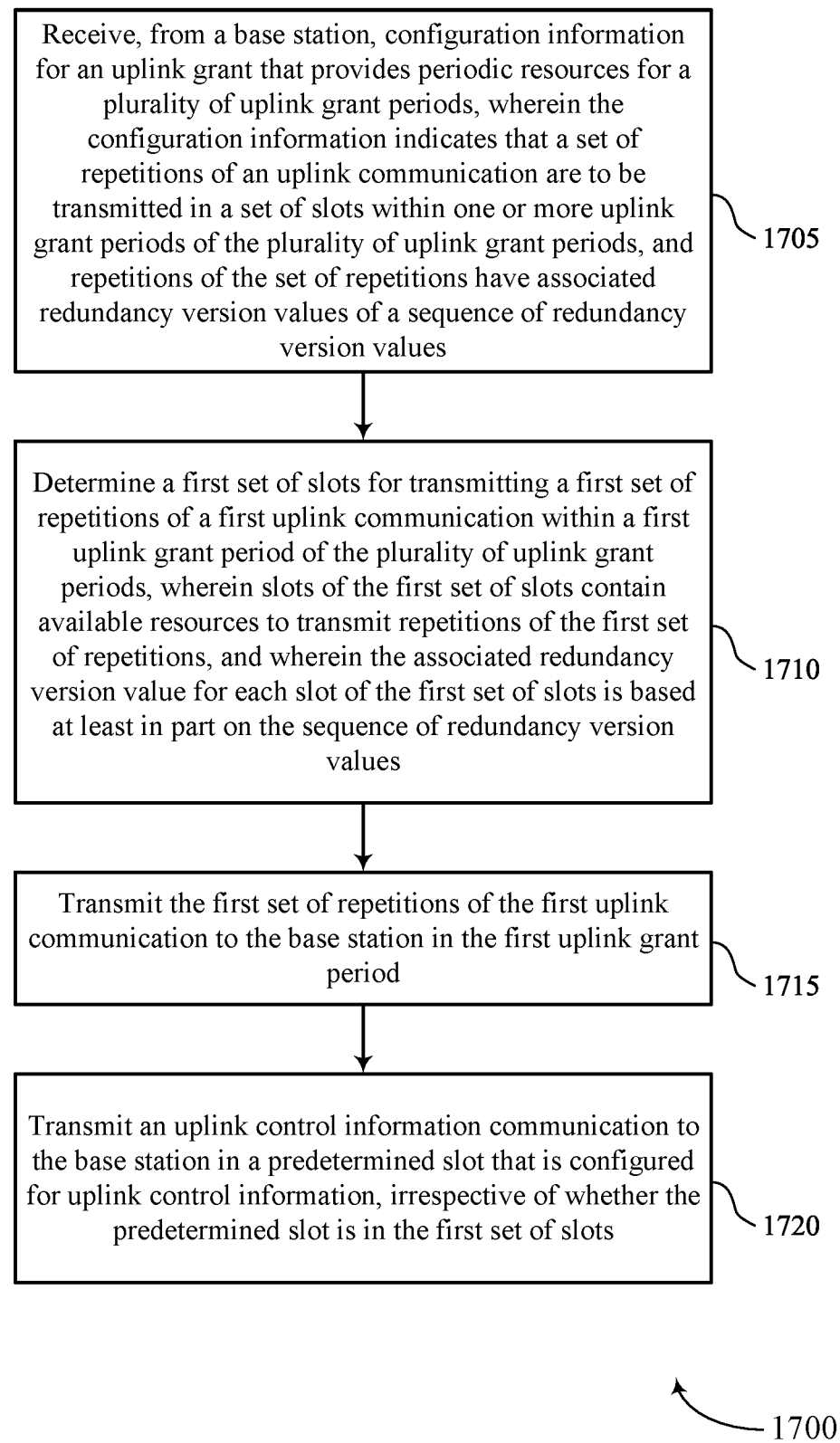

FIG. 17 shows a flowchart illustrating a method 1700 that supports uplink configured grant transmission repetition techniques in wireless communications in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The operations of 1705 may be performed in accordance with examples as disclosed herein. In some examples, aspects of the operations of 1705 may be performed by a configured grant manager 925 as described with reference to FIG. 9.

At 1710, the method may include determining a first set of slots for transmitting a first set of repetitions of a first uplink communication within a first uplink grant period of the set of multiple uplink grant periods, where slots of the first set of slots contain available resources to transmit repetitions of the first set of repetitions, and where an associated redundancy version value for each slot of the first set of slots is based on the sequence of redundancy version values. The operations of 1710 may be performed in accordance with examples as disclosed herein. In some examples, aspects of the operations of 1710 may be performed by an uplink repetition manager 930 as described with reference to FIG. 9.

At 1715, the method may include transmitting the first set of repetitions of the first uplink communication to the base station in the first uplink grant period. The operations of 1715 may be performed in accordance with examples as disclosed herein. In some examples, aspects of the operations of 1715 may be performed by an uplink transmission manager 935 as described with reference to FIG. 9.

At 1720, the method may include transmitting an uplink control information communication to the base station in a predetermined slot that is configured for uplink control information, irrespective of whether the predetermined slot is in the first set of slots. The operations of 1720 may be performed in accordance with examples as disclosed herein. In some examples, aspects of the operations of 1720 may be performed by an uplink control information manager 955 as described with reference to FIG. 9.

Figure 18:
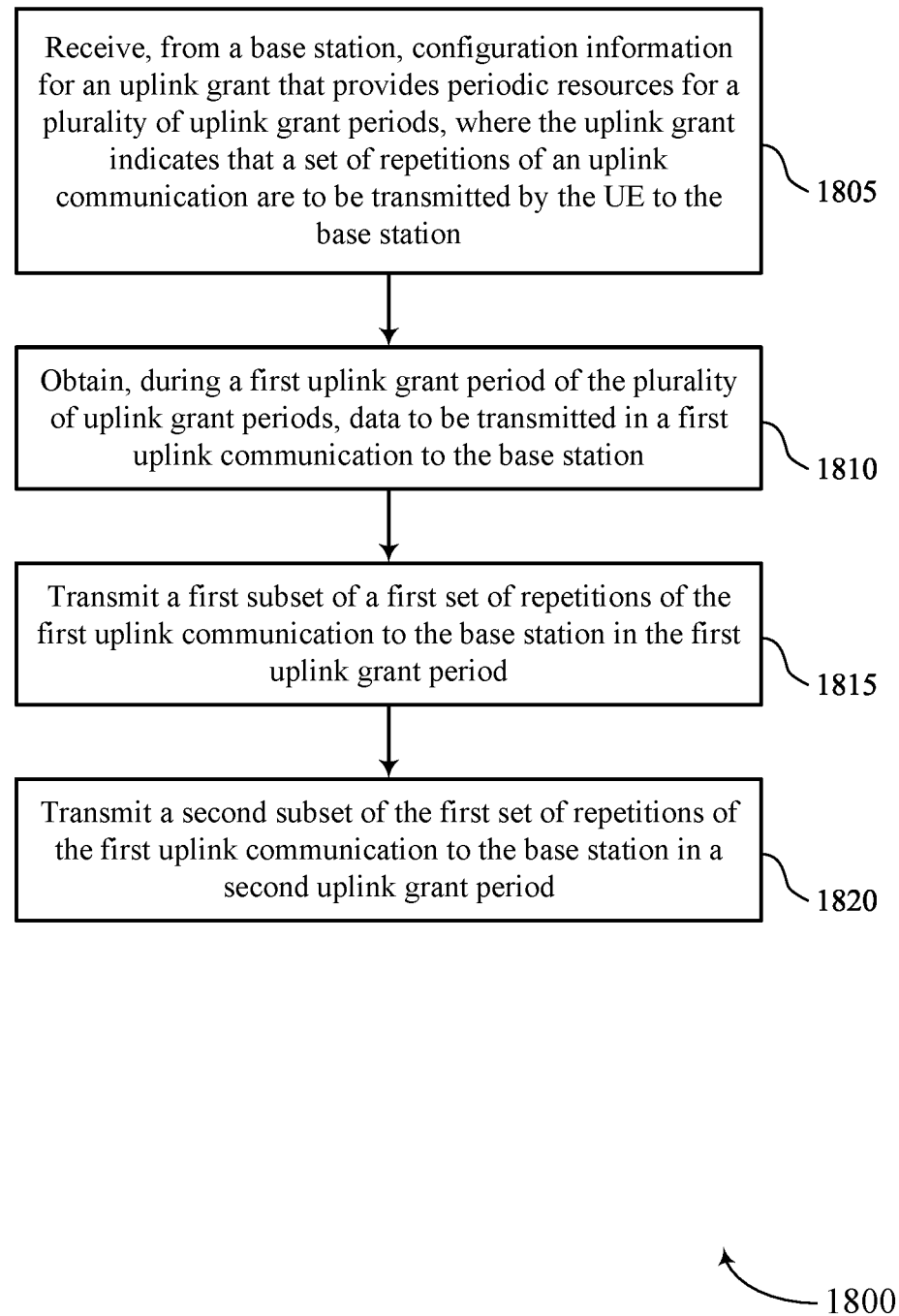

FIG. 18 shows a flowchart illustrating a method 1800 that supports uplink configured grant transmission repetition techniques in wireless communications in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, configuration information for an uplink grant that provides periodic resources for a set of multiple uplink grant periods, where the uplink grant indicates that a set of repetitions of an uplink communication are to be transmitted by the UE to the base station. The operations of 1805 may be performed in accordance with examples as disclosed herein. In some examples, aspects of the operations of 1805 may be performed by a configured grant manager 925 as described with reference to FIG. 9.

At 1810, the method may include obtaining, during a first uplink grant period of the set of multiple uplink grant periods, data to be transmitted in a first uplink communication to the base station. The operations of 1810 may be performed in accordance with examples as disclosed herein. In some examples, aspects of the operations of 1810 may be performed by an uplink data manager 940 as described with reference to FIG. 9.

At 1815, the method may include transmitting a first subset of a first set of repetitions of the first uplink communication to the base station in the first uplink grant period. The operations of 1815 may be performed in accordance with examples as disclosed herein. In some examples, aspects of the operations of 1815 may be performed by an uplink transmission manager 935 as described with reference to FIG. 9.

At 1820, the method may include transmitting a second subset of the first set of repetitions of the first uplink communication to the base station in a second uplink grant period. The operations of 1820 may be performed in accordance with examples as disclosed herein. In some examples, aspects of the operations of 1820 may be performed by an uplink transmission manager 935 as described with reference to FIG. 9.

Figure 19:
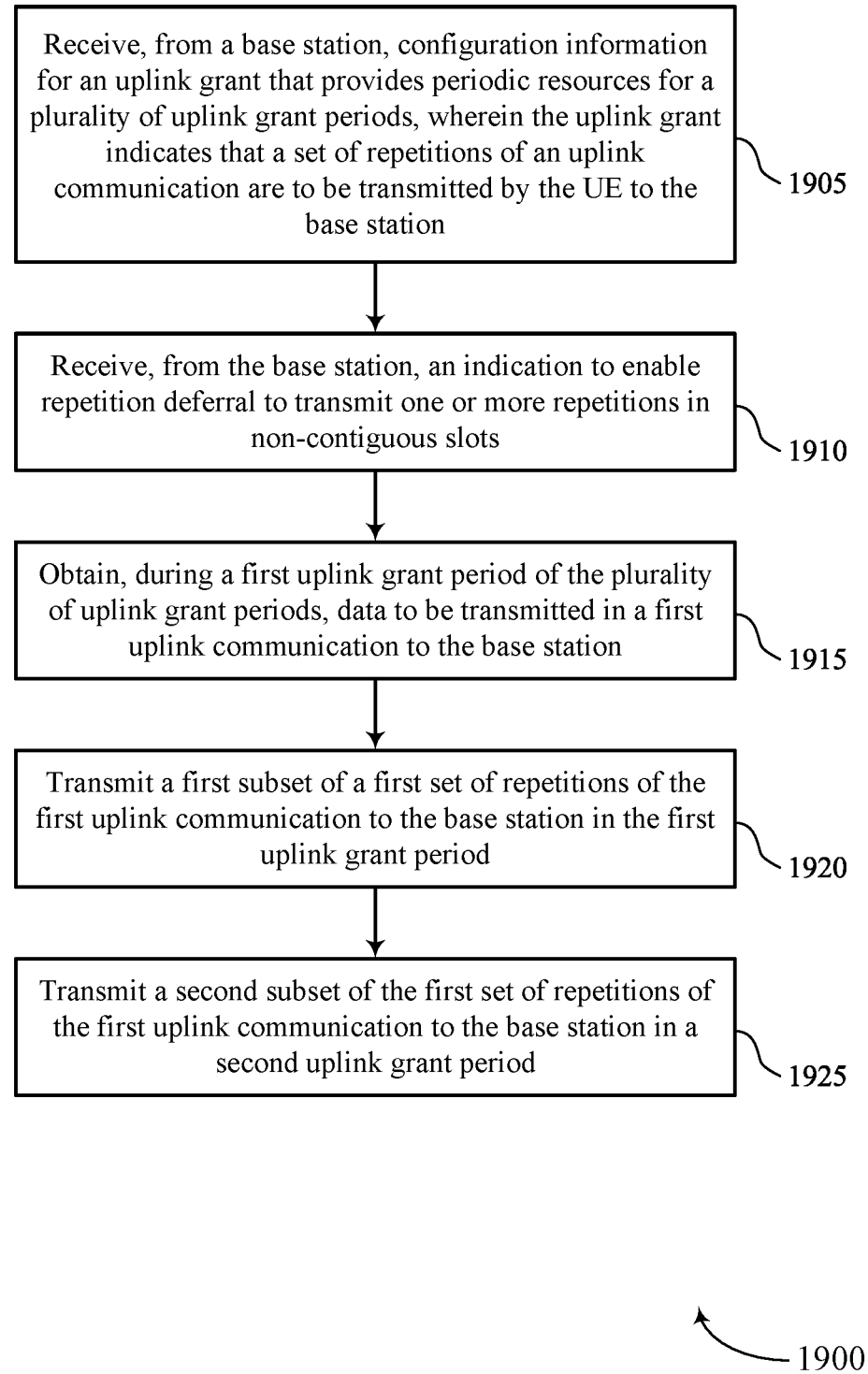

FIG. 19 shows a flowchart illustrating a method 1900 that supports uplink configured grant transmission repetition techniques in wireless communications in accordance with aspects of the present disclosure. The operations of the method 1900 may be implemented by a UE or its components as described herein. For example, the operations of the method 1900 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, configuration information for an uplink grant that provides periodic resources for a set of multiple uplink grant periods, where the uplink grant indicates that a set of repetitions of an uplink communication are to be transmitted by the UE to the base station. The operations of 1905 may be performed in accordance with examples as disclosed herein. In some examples, aspects of the operations of 1905 may be performed by a configured grant manager 925 as described with reference to FIG. 9.

At 1910, the method may include receiving, from the base station, an indication to enable repetition deferral to transmit one or more repetitions in non-contiguous slots. The operations of 1910 may be performed in accordance with examples as disclosed herein. In some examples, aspects of the operations of 1910 may be performed by an uplink repetition manager 930 as described with reference to FIG. 9.

At 1915, the method may include obtaining, during a first uplink grant period of the set of multiple uplink grant periods, data to be transmitted in a first uplink communication to the base station. The operations of 1915 may be performed in accordance with examples as disclosed herein. In some examples, aspects of the operations of 1915 may be performed by an uplink data manager 940 as described with reference to FIG. 9.

At 1920, the method may include transmitting a first subset of a first set of repetitions of the first uplink communication to the base station in the first uplink grant period. The operations of 1920 may be performed in accordance with examples as disclosed herein. In some examples, aspects of the operations of 1920 may be performed by an uplink transmission manager 935 as described with reference to FIG. 9.

At 1925, the method may include transmitting a second subset of the first set of repetitions of the first uplink communication to the base station in a second uplink grant period. The operations of 1925 may be performed in accordance with examples as disclosed herein. In some examples, aspects of the operations of 1925 may be performed by an uplink transmission manager 935 as described with reference to FIG. 9.

Figure 20:
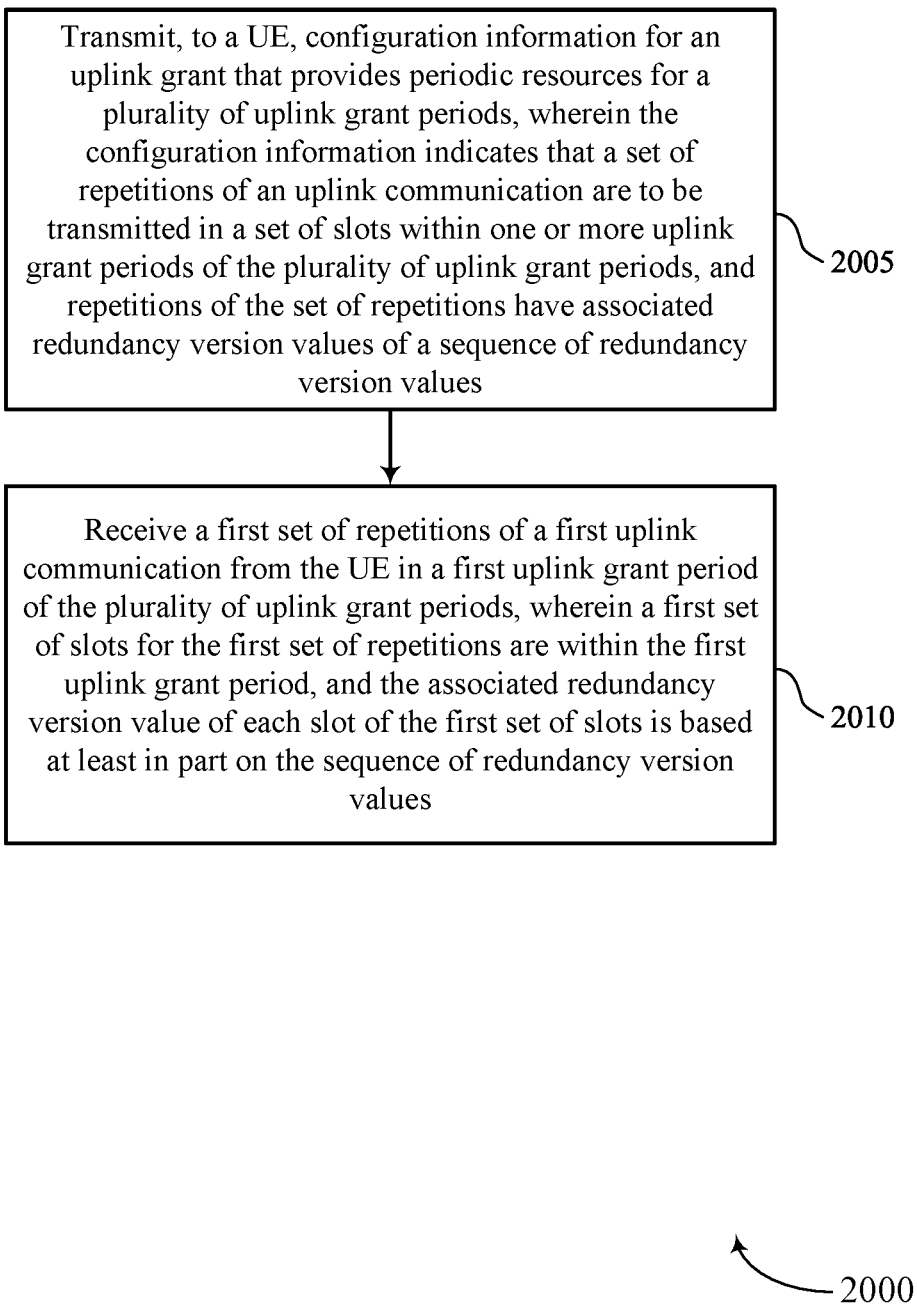

FIG. 20 shows a flowchart illustrating a method 2000 that supports uplink configured grant transmission repetition techniques in wireless communications in accordance with aspects of the present disclosure. The operations of the method 2000 may be implemented by a base station or its components as described herein. For example, the operations of the method 2000 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The operations of 2005 may be performed in accordance with examples as disclosed herein. In some examples, aspects of the operations of 2005 may be performed by a configured grant manager 1325 as described with reference to FIG. 13.

At 2010, the method may include receiving a first set of repetitions of a first uplink communication from the UE in a first uplink grant period of the set of multiple uplink grant periods, where a first set of slots for the first set of repetitions are within the first uplink grant period, and the associated redundancy version value of each slot of the first set of slots is based on the sequence of redundancy version values. The operations of 2010 may be performed in accordance with examples as disclosed herein. In some examples, aspects of the operations of 2010 may be performed by an uplink repetition manager 1330 as described with reference to FIG. 13.

Figure 21:
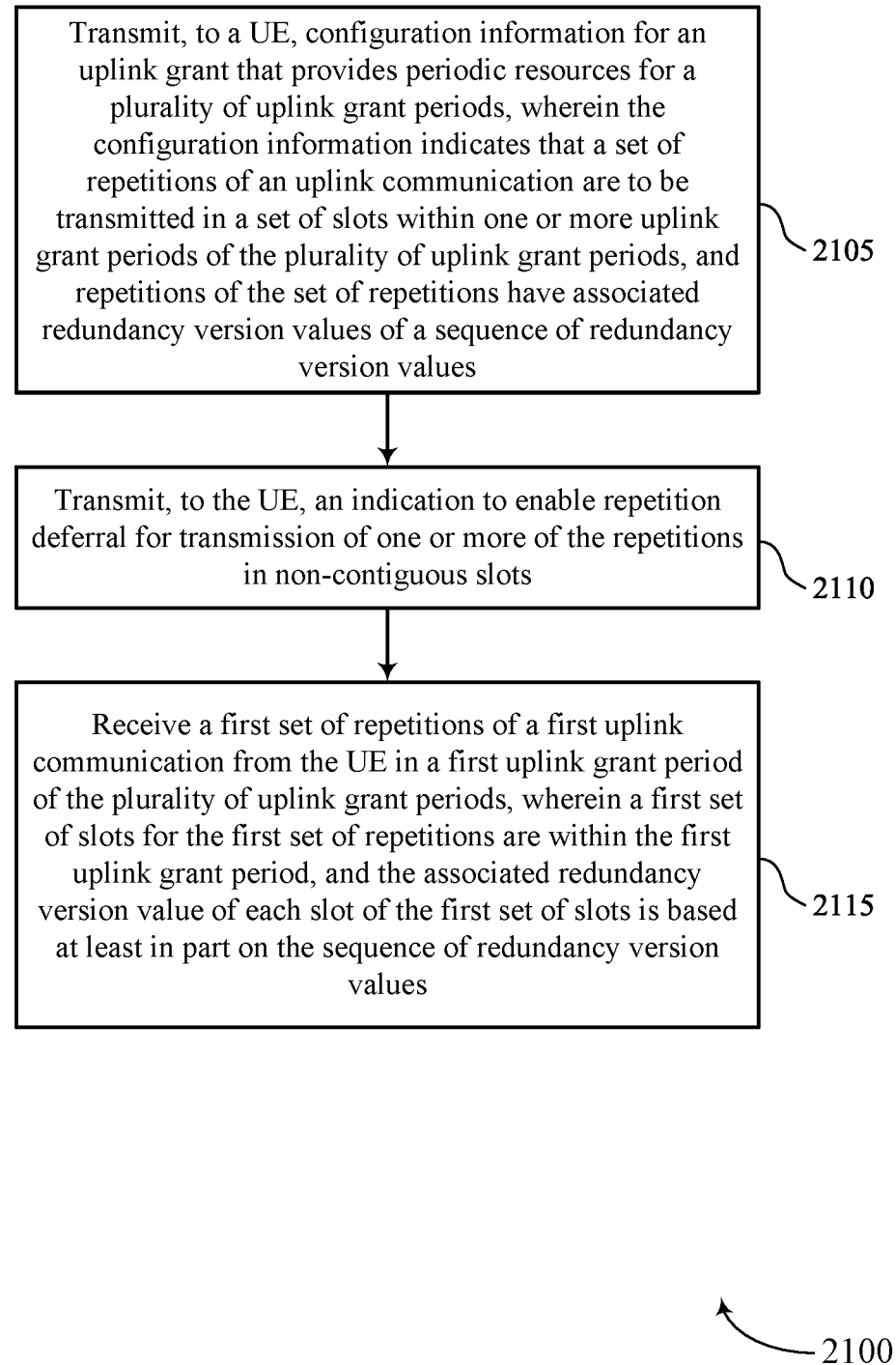

FIG. 21 shows a flowchart illustrating a method 2100 that supports uplink configured grant transmission repetition techniques in wireless communications in accordance with aspects of the present disclosure. The operations of the method 2100 may be implemented by a base station or its components as described herein. For example, the operations of the method 2100 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The operations of 2105 may be performed in accordance with examples as disclosed herein. In some examples, aspects of the operations of 2105 may be performed by a configured grant manager 1325 as described with reference to FIG. 13.

At 2110, the method may include transmitting, to the UE, an indication to enable repetition deferral for transmission of one or more of the repetitions in non-contiguous slots. The operations of 2110 may be performed in accordance with examples as disclosed herein. In some examples, aspects of the operations of 2110 may be performed by an uplink repetition manager 1330 as described with reference to FIG. 13.

At 2115, the method may include receiving a first set of repetitions of a first uplink communication from the UE in a first uplink grant period of the set of multiple uplink grant periods, where a first set of slots for the first set of repetitions are within the first uplink grant period, and the associated redundancy version value of each slot of the first set of slots is based on the sequence of redundancy version values. The operations of 2115 may be performed in accordance with examples as disclosed herein. In some examples, aspects of the operations of 2115 may be performed by an uplink repetition manager 1330 as described with reference to FIG. 13.

Figure 22:
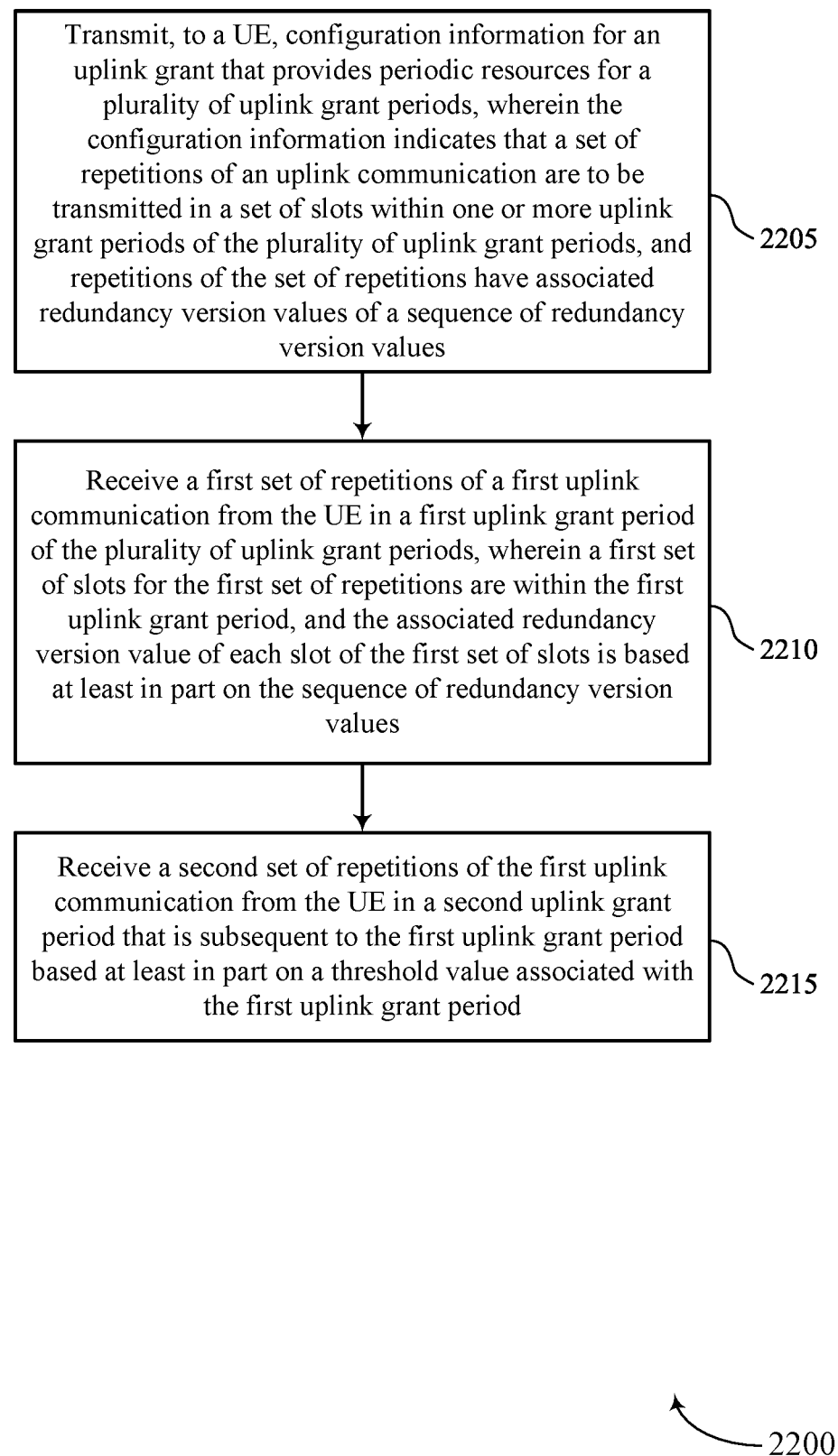

FIG. 22 shows a flowchart illustrating a method 2200 that supports uplink configured grant transmission repetition techniques in wireless communications in accordance with aspects of the present disclosure. The operations of the method 2200 may be implemented by a base station or its components as described herein. For example, the operations of the method 2200 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The operations of 2205 may be performed in accordance with examples as disclosed herein. In some examples, aspects of the operations of 2205 may be performed by a configured grant manager 1325 as described with reference to FIG. 13.

At 2210, the method may include receiving a first set of repetitions of a first uplink communication from the UE in a first uplink grant period of the set of multiple uplink grant periods, where a first set of slots for the first set of repetitions are within the first uplink grant period, and the associated redundancy version value of each slot of the first set of slots is based on the sequence of redundancy version values. The operations of 2210 may be performed in accordance with examples as disclosed herein. In some examples, aspects of the operations of 2210 may be performed by an uplink repetition manager 1330 as described with reference to FIG. 13.

At 2215, the method may include receiving a second set of repetitions of the first uplink communication from the UE in a second uplink grant period that is subsequent to the first uplink grant period based on a threshold value associated with the first uplink grant period. The operations of 2215 may be performed in accordance with examples as disclosed herein. In some examples, aspects of the operations of 2215 may be performed by an uplink repetition manager 1330 as described with reference to FIG. 13. In some cases, the threshold value corresponds to a number of repetitions available in the first uplink grant period, a periodicity of uplink grant periods, a number of available slots for uplink grant repetitions within the one or more uplink grant periods, or any combinations thereof.

Figure 23:
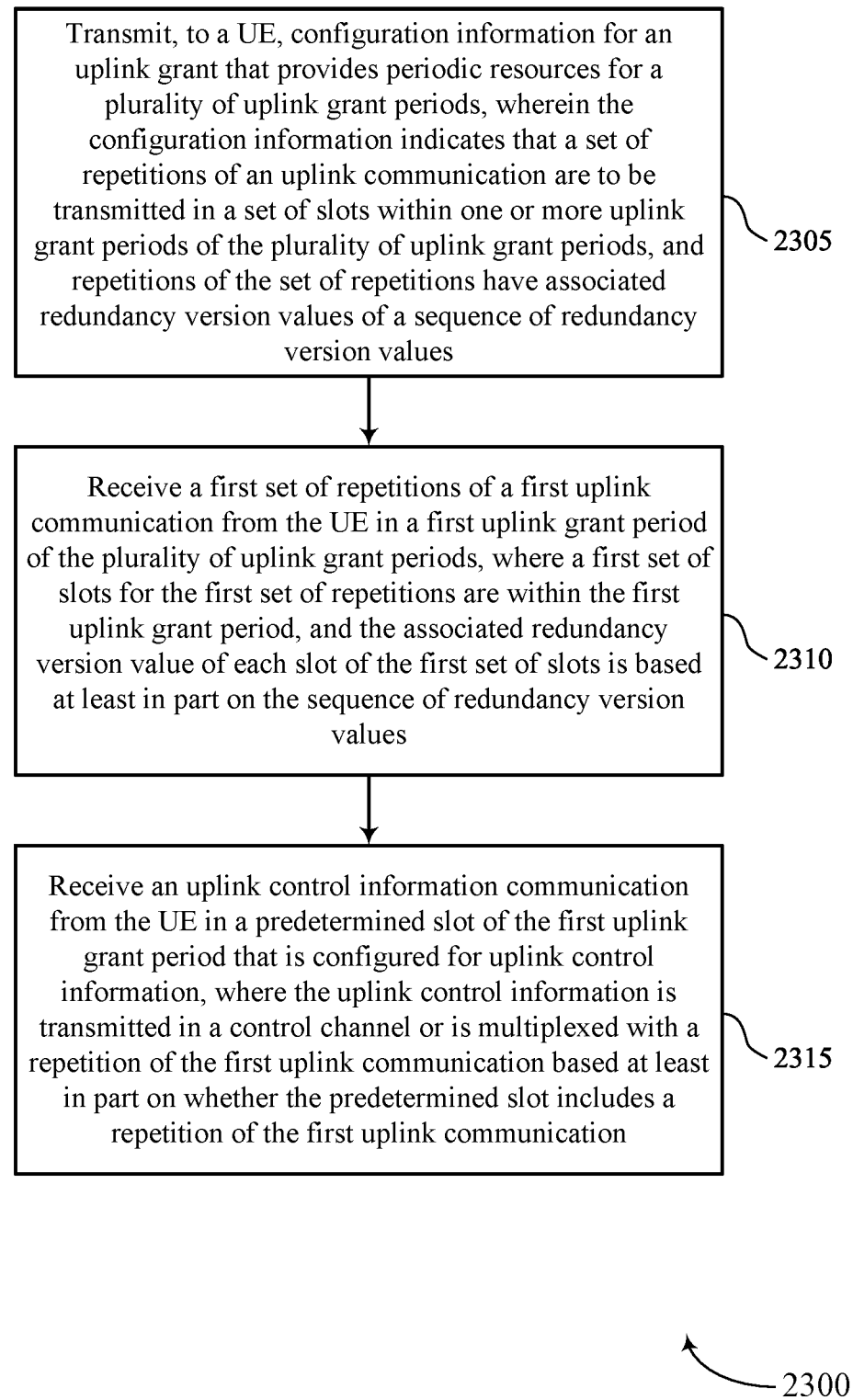

FIG. 23 shows a flowchart illustrating a method 2300 that supports uplink configured grant transmission repetition techniques in wireless communications in accordance with aspects of the present disclosure. The operations of the method 2300 may be implemented by a base station or its components as described herein. For example, the operations of the method 2300 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2305, the method may include transmitting, to a UE, configuration information for an uplink grant that provides periodic resources for a set of multiple uplink grant periods, where the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values. The operations of 2305 may be performed in accordance with examples as disclosed herein. In some examples, aspects of the operations of 2305 may be performed by a configured grant manager 1325 as described with reference to FIG. 13.

At 2310, the method may include receiving a first set of repetitions of a first uplink communication from the UE in a first uplink grant period of the set of multiple uplink grant periods, where a first set of slots for the first set of repetitions are within the first uplink grant period, and the associated redundancy version value of each slot of the first set of slots is based on the sequence of redundancy version values. The operations of 2310 may be performed in accordance with examples as disclosed herein. In some examples, aspects of the operations of 2310 may be performed by an uplink repetition manager 1330 as described with reference to FIG. 13.

At 2315, the method may include receiving an uplink control information communication from the UE in a predetermined slot of the first uplink grant period that is configured for uplink control information, where the uplink control information is transmitted in a control channel or is multiplexed with a repetition of the first uplink communication based on whether the predetermined slot includes a repetition of the first uplink communication. The operations of 2315 may be performed in accordance with examples as disclosed herein. In some examples, aspects of the operations of 2315 may be performed by an uplink control information manager 1345 as described with reference to FIG. 13.

The following provides an overview of aspects of the present disclosure:

Aspect 1: A method for wireless communication at a UE, comprising: receiving, from a base station, configuration information for an uplink grant that provides periodic resources for a plurality of uplink grant periods, wherein the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values; determining a first set of slots for transmitting a first set of repetitions of a first uplink communication within a first uplink grant period of the plurality of uplink grant periods, wherein slots of the first set of slots contain available resources to transmit repetitions of the first set of repetitions, and wherein an associated redundancy version value for each slot of the first set of slots is based at least in part on the sequence of redundancy version values; and transmitting the first set of repetitions of the first uplink communication to the base station in the first uplink grant period.

Aspect 2: The method of aspect 1, wherein the first set of slots for the first set of repetitions are non-contiguous slots within the first uplink grant period.

Aspect 3: The method of any of aspects 1 through 2, further comprising: identifying, during the first uplink grant period, data to be transmitted in the first uplink communication; and determining an initial slot for an initial repetition of the first set of repetitions that is subsequent to a starting slot of the first set of slots, wherein the initial slot is based at least in part on one or more available transmission starting locations within the sequence of redundancy version values, and wherein a number of repetitions of the first uplink communication is based at least in part on an indication in the grant, a number of available starting locations, a location of the initial slot within the first set of slots, or any combinations thereof.

Aspect 4: The method of any of aspects 1 through 3, further comprising: receiving, from the base station, an indication to enable repetition deferral to transmit one or more of the repetitions and wherein an initial slot for the first uplink communication is an earliest slot of the first set of slots.

Aspect 5: The method of aspect 1, further comprising: receiving, from the base station, a repetition configuration that indicates that repetitions start from an initial slot of the first set of slots or that indicates that repetitions can start at any slot of the first set of slots that has an initial redundancy version value of the sequence of redundancy version values.

Aspect 6: The method of any of aspects 1 through 5, further comprising: receiving, from the base station, a repetition configuration that indicates that a subset of the first set of slots are available for an initial repetition of the uplink communication, wherein the subset of the first set of slots include an initial portion of the first set of slots that have an initial redundancy version value of the sequence of redundancy version values.

Aspect 7: The method of any of aspects 1 through 6, wherein an initial slot of the first set of slots is subsequent to an earliest slot of the first uplink grant period, and wherein the sequence of redundancy version values starts at the earliest slot of the first uplink grant period and the initial slot uses a redundancy version value from the sequence of redundancy version values that corresponds to a location of the initial slot relative to the earliest slot of the first uplink grant period.

Aspect 8: The method of any of aspects 1 through 6, wherein an initial slot of the first set of slots is subsequent to an earliest slot of the first uplink grant period, and wherein the sequence of redundancy version values starts at the initial slot of the first set of slots.

Aspect 9: The method of any of aspects 1 through 8, wherein a feedback process identification for the first uplink communication is based at least in part on a first symbol of a first slot of the first uplink grant period irrespective of whether the first slot of the first uplink grant period includes a repetition of the first uplink communication.

Aspect 10: The method of any of aspects 1 through 8, wherein a feedback process identification for the first uplink communication is based at least in part on a first symbol of an earliest slot of the first uplink grant period that includes a repetition of the first uplink communication.

Aspect 11: The method of any of aspects 1 through 10, further comprising: transmitting a second set of repetitions of the first uplink communication to the base station in a second uplink grant period that is subsequent to the first uplink grant period.

Aspect 12: The method of aspect 11, wherein the second set of repetitions are transmitted based at least in part on a threshold value associated with the first uplink grant period, and wherein the threshold value corresponds to a number of repetitions available in the first uplink grant period, a periodicity of uplink grant periods, a number of available slots for uplink grant repetitions within the one or more uplink grant periods, or any combinations thereof.

Aspect 13: The method of any of aspects 1 through 12, further comprising: transmitting an uplink control information communication to the base station in a predetermined slot that is configured for uplink control information, irrespective of whether the predetermined slot is in the first set of slots.

Aspect 14: The method of aspect 13, wherein the uplink control information is multiplexed with a repetition of the first set of repetitions when the predetermined slot is in the first set of slots and the uplink control information is not multiplexed with a repetition of the first set of repetitions when the predetermined slot is not in the first set of slots.

Aspect 15: A method for wireless communication at a UE, comprising: receiving, from a base station, configuration information for an uplink grant that provides periodic resources for a plurality of uplink grant periods, wherein the uplink grant indicates that a set of repetitions of an uplink communication are to be transmitted by the UE to the base station; obtaining, during a first uplink grant period of the plurality of uplink grant periods, data to be transmitted in a first uplink communication to the base station; transmitting a first subset of a first set of repetitions of the first uplink communication to the base station in the first uplink grant period; and transmitting a second subset of the first set of repetitions of the first uplink communication to the base station in a second uplink grant period.

Aspect 16: The method of aspect 15, wherein the second subset of the first set of repetitions are transmitted based at least in part on a threshold value associated with the first uplink grant period.

Aspect 17: The method of aspect 16, wherein the threshold value corresponds to a number of repetitions available in the first uplink grant period, a periodicity of uplink grant periods, a number of available slots for uplink grant repetitions within the one or more uplink grant periods, or any combinations thereof.

Aspect 18: The method of any of aspects 15 through 17, further comprising: receiving, from the base station, an indication to enable repetition deferral to transmit one or more repetitions in non-contiguous slots.

Aspect 19: The method of any of aspects 15 through 18, wherein a first set of slots for the first set of repetitions are non-contiguous slots within the first uplink grant period, and an associated redundancy version value of each slot of the first set of slots is based at least in part on a sequence of redundancy version values associated with the first set of repetitions.

Aspect 20: The method of aspect 19, wherein an initial slot of the first set of slots for the first set of repetitions is subsequent to an earliest slot of the first uplink grant period, and wherein the sequence of redundancy version is determined based at least in part on the earliest slot of the first uplink grant period or the initial slot of the first set of slots.

Aspect 21: The method of any of aspects 15 through 20, wherein a feedback process identification for the first uplink communication is based at least in part on a first symbol of an earliest slot of the first uplink grant period that includes a repetition of the first uplink communication.

Aspect 22: The method of any of aspects 15 through 21, further comprising: transmitting an uplink control information communication to the base station in a predetermined slot of the first uplink grant period that is configured for uplink control information, wherein the uplink control information is transmitted in a control channel or is multiplexed with a repetition of the first uplink communication based at least in part on whether the predetermined slot includes a repetition of the first uplink communication.

Aspect 23: A method for wireless communication at a base station, comprising: transmitting, to a UE, configuration information for an uplink grant that provides periodic resources for a plurality of uplink grant periods, wherein the configuration information indicates that a set of repetitions of an uplink communication are to be transmitted in a set of slots within one or more uplink grant periods of the plurality of uplink grant periods, and repetitions of the set of repetitions have associated redundancy version values of a sequence of redundancy version values; and receiving a first set of repetitions of a first uplink communication from the UE in a first uplink grant period of the plurality of uplink grant periods, wherein a first set of slots for the first set of repetitions are within the first uplink grant period, and the associated redundancy version value of each slot of the first set of slots is based at least in part on the sequence of redundancy version values.

Aspect 24: The method of aspect 23, further comprising: transmitting, to the UE, an indication to enable repetition deferral for transmission of one or more of the repetitions in non-contiguous slots.

Aspect 25: The method of any of aspects 23 through 24, wherein an initial slot of the first set of slots for the first set of repetitions is subsequent to an earliest slot of the first uplink grant period, and wherein the sequence of redundancy version is determined based at least in part on the earliest slot of the first uplink grant period or the initial slot of the first set of slots.

Aspect 26: The method of any of aspects 23 through 25, wherein a feedback process identification for the first uplink communication is based at least in part on a first symbol of an earliest slot of the first uplink grant period that includes a repetition of the first uplink communication.

Aspect 27: The method of any of aspects 23 through 26, further comprising: receiving a second set of repetitions of the first uplink communication from the UE in a second uplink grant period that is subsequent to the first uplink grant period based at least in part on a threshold value associated with the first uplink grant period, and wherein the threshold value corresponds to a number of repetitions available in the first uplink grant period, a periodicity of uplink grant periods, a number of available slots for uplink grant repetitions within the one or more uplink grant periods, or any combinations thereof.

Aspect 28: The method of any of aspects 23 through 27, further comprising: receiving an uplink control information communication from the UE in a predetermined slot of the first uplink grant period that is configured for uplink control information, wherein the uplink control information is transmitted in a control channel or is multiplexed with a repetition of the first uplink communication based at least in part on whether the predetermined slot includes a repetition of the first uplink communication.

Aspect 29: An apparatus for wireless communication at a UE, comprising a processor; memory coupled with the processor; and instructions stored in the memory and executable by the processor to cause the apparatus to perform a method of any of aspects 1 through 14.

Aspect 30: An apparatus for wireless communication at a UE, comprising at least one means for performing a method of any of aspects 1 through 14.

Aspect 31: A non-transitory computer-readable medium storing code for wireless communication at a UE, the code comprising instructions executable by a processor to perform a method of any of aspects 1 through 14.

Aspect 32: An apparatus for wireless communication at a UE, comprising a processor; memory coupled with the processor; and instructions stored in the memory and executable by the processor to cause the apparatus to perform a method of any of aspects 15 through 22.

Aspect 33: An apparatus for wireless communication at a UE, comprising at least one means for performing a method of any of aspects 15 through 22.

Aspect 34: A non-transitory computer-readable medium storing code for wireless communication at a UE, the code comprising instructions executable by a processor to perform a method of any of aspects 15 through 22.

Aspect 35: An apparatus for wireless communication at a base station, comprising a processor; memory coupled with the processor; and instructions stored in the memory and executable by the processor to cause the apparatus to perform a method of any of aspects 23 through 28.

Aspect 36: An apparatus for wireless communication at a base station, comprising at least one means for performing a method of any of aspects 23 through 28.

Aspect 37: A non-transitory computer-readable medium storing code for wireless communication at a base station, the code comprising instructions executable by a processor to perform a method of any of aspects 23 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:
one or more memories storing processor-executable code; and
one or more processors coupled with the one or more memories and individually or collectively operable to execute the code to cause the UE to:
receive configuration information for an uplink grant that provides periodic resources for a plurality of uplink grant periods, wherein the configuration information indicates that a set of repetitions of an uplink communication are to be transmitted in one or more uplink grant periods of the plurality of uplink grant periods;
receive an indication to enable repetition deferral to transmit one or more of the set of repetitions;
determine, prior to an initial slot of a first uplink grant period of the plurality of uplink grant periods, a first set of slots for transmitting a first set of repetitions of a first uplink communication within the first uplink grant period, wherein slots of the first set of slots contain available resources to transmit repetitions of the first set of repetitions;
transmit, based at least in part on the indication to enable repetition deferral, the first set of repetitions of the first uplink communication in the first uplink grant period; and
transmit an uplink control information communication in a predetermined slot that is configured for uplink control information, irrespective of whether the predetermined slot is in the first set of slots,
wherein the uplink control information is multiplexed with a repetition of the first set of repetitions when the predetermined slot is in the first set of slots and the uplink control information is not multiplexed with a repetition of the first set of repetitions when the predetermined slot is not in the first set of slots.

2. The UE of claim 1, wherein the one or more processors are individually or collectively further operable to execute the code to cause the UE to:
identify, during the first uplink grant period, data to be transmitted in the first uplink communication; and
determine an initial slot for an initial repetition of the first set of repetitions that is subsequent to a starting slot of the first set of slots, wherein the initial slot is based at least in part on one or more available transmission starting locations within a sequence of redundancy version values, and wherein a number of repetitions of the first uplink communication is based at least in part on an indication in the uplink grant, a number of available starting locations, a location of the initial slot within the first set of slots, or any combinations thereof.

3. The UE of claim 1, wherein the indication to enable repetition deferral is received via the configuration information, and wherein an initial slot for the first uplink communication is an earliest slot of the first set of slots.

4. The UE of claim 1, wherein the one or more processors are individually or collectively further operable to execute the code to cause the UE to:
receive a repetition configuration that indicates that repetitions start from an initial slot of the first set of slots or that indicates that repetitions start at any slot of the first set of slots that has an initial redundancy version value of a sequence of redundancy version values.

5. The UE of claim 1, wherein the one or more processors are individually or collectively further operable to execute the code to cause the UE to:
receive a repetition configuration that indicates that a subset of the first set of slots are available for an initial repetition of the uplink communication, wherein the subset of the first set of slots include an initial portion of the first set of slots that have an initial redundancy version value of a sequence of redundancy version values.

6. The UE of claim 1, wherein:
an initial slot of the first set of slots is subsequent to an earliest slot of the first uplink grant period, and
a sequence of redundancy version values starts at the earliest slot of the first uplink grant period and the initial slot uses a redundancy version value from the sequence of redundancy version values that corresponds to a location of the initial slot relative to the earliest slot of the first uplink grant period.

7. The UE of claim 1, wherein:
an initial slot of the first set of slots is subsequent to an earliest slot of the first uplink grant period, and
a sequence of redundancy version values starts at the initial slot of the first set of slots.

8. The UE of claim 1, wherein a feedback process identification for the first uplink communication is based at least in part on a first symbol of a first slot of the first uplink grant period irrespective of whether the first slot of the first uplink grant period includes a repetition of the first uplink communication.

9. The UE of claim 1, wherein a feedback process identification for the first uplink communication is based at least in part on a first symbol of an earliest slot of the first uplink grant period that includes a repetition of the first uplink communication.

10. The UE of claim 1, wherein the one or more processors are individually or collectively further operable to execute the code to cause the UE to:
transmit a second set of repetitions of the first uplink communication in a second uplink grant period that is subsequent to the first uplink grant period.

11. The UE of claim 10, wherein:
the second set of repetitions are transmitted based at least in part on a threshold value associated with the first uplink grant period, and
the threshold value corresponds to a number of repetitions available in the first uplink grant period, a periodicity of uplink grant periods, a number of available slots for uplink grant repetitions within the one or more uplink grant periods, or any combinations thereof.

12. A method for wireless communication at a user equipment (UE), comprising:
receiving configuration information for an uplink grant that provides periodic resources for a plurality of uplink grant periods, wherein the configuration information indicates that a set of repetitions of an uplink communication are to be transmitted in one or more uplink grant periods of the plurality of uplink grant periods;
receiving an indication to enable repetition deferral to transmit one or more of the set of repetitions;
determining, prior to an initial slot of a first uplink grant period of the plurality of uplink grant periods, a first set of slots for transmitting a first set of repetitions of a first uplink communication within the first uplink grant period, wherein slots of the first set of slots contain available resources to transmit repetitions of the first set of repetitions;
transmitting, based at least in part on the indication to enable repetition deferral, the first set of repetitions of the first uplink communication in the first uplink grant period; and
transmitting an uplink control information communication in a predetermined slot that is configured for uplink control information, irrespective of whether the predetermined slot is in the first set of slots,
wherein the uplink control information is multiplexed with a repetition of the first set of repetitions when the predetermined slot is in the first set of slots and the uplink control information is not multiplexed with a repetition of the first set of repetitions when the predetermined slot is not in the first set of slots.

13. The method of claim 12, further comprising:
identifying, during the first uplink grant period, data to be transmitted in the first uplink communication; and
determining an initial slot for an initial repetition of the first set of repetitions that is subsequent to a starting slot of the first set of slots, wherein the initial slot is based at least in part on one or more available transmission starting locations within a sequence of redundancy version values, and wherein a number of repetitions of the first uplink communication is based at least in part on an indication in the uplink grant, a number of available starting locations, a location of the initial slot within the first set of slots, or any combinations thereof.

14. The method of claim 12, wherein the indication to enable repetition deferral is received via the configuration information, and wherein an initial slot for the first uplink communication is an earliest slot of the first set of slots.

15. The method of claim 12, further comprising:
receiving a repetition configuration that indicates that repetitions start from an initial slot of the first set of slots or that indicates that repetitions start at any slot of the first set of slots that has an initial redundancy version value of a sequence of redundancy version values.

16. The method of claim 12, further comprising:
receiving a repetition configuration that indicates that a subset of the first set of slots are available for an initial repetition of the uplink communication, wherein the subset of the first set of slots include an initial portion of the first set of slots that have an initial redundancy version value of a sequence of redundancy version values.

17. The method of claim 12, wherein an initial slot of the first set of slots is subsequent to an earliest slot of the first uplink grant period, and wherein a sequence of redundancy version values starts at the earliest slot of the first uplink grant period and the initial slot uses a redundancy version value from the sequence of redundancy version values that corresponds to a location of the initial slot relative to the earliest slot of the first uplink grant period.

18. The method of claim 12, wherein an initial slot of the first set of slots is subsequent to an earliest slot of the first uplink grant period, and wherein a sequence of redundancy version values starts at the initial slot of the first set of slots.

19. The method of claim 12, wherein a feedback process identification for the first uplink communication is based at least in part on a first symbol of a first slot of the first uplink grant period irrespective of whether the first slot of the first uplink grant period includes a repetition of the first uplink communication.

20. A non-transitory computer-readable medium storing code for wireless communication, the code comprising instructions executable by one or more processors to:
- receive configuration information for an uplink grant that provides periodic resources for a plurality of uplink grant periods, wherein the configuration information indicates that a set of repetitions of an uplink communication are to be transmitted in one or more uplink grant periods of the plurality of uplink grant periods;
- receive an indication to enable repetition deferral to transmit one or more of the set of repetitions;
- determine, prior to an initial slot of a first uplink grant period of the plurality of uplink grant periods, a first set of slots for transmitting a first set of repetitions of a first uplink communication within the first uplink grant period, wherein slots of the first set of slots contain available resources to transmit repetitions of the first set of repetitions;
- transmit, based at least in part on the indication to enable repetition deferral, the first set of repetitions of the first uplink communication in the first uplink grant period; and
- transmit an uplink control information communication in a predetermined slot that is configured for uplink control information, irrespective of whether the predetermined slot is in the first set of slots,
- wherein the uplink control information is multiplexed with a repetition of the first set of repetitions when the predetermined slot is in the first set of slots and the uplink control information is not multiplexed with a repetition of the first set of repetitions when the predetermined slot is not in the first set of slots.

* * * * *